US012652293B2

(12) United States Patent
Lai et al.

(10) Patent No.: US 12,652,293 B2
(45) Date of Patent: Jun. 9, 2026

(54) DATA CENTRIC APPROACH FOR SUPPORTING MULTIPLE INLINE CLOUD SERVICES

(71) Applicant: Palo Alto Networks, Inc., Santa Clara, CA (US)

(72) Inventors: Weiming Lai, Fremont, CA (US); Xin Luo, Fremont, CA (US); Kashyap Tavarekere Ananthapadmanabha, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 203 days.

(21) Appl. No.: 18/385,834

(22) Filed: Oct. 31, 2023

(65) Prior Publication Data

US 2025/0141886 A1 May 1, 2025

(51) Int. Cl.
G06F 15/16 (2006.01)
G06F 9/54 (2006.01)
(Continued)

(52) U.S. Cl.
CPC ................................. H04L 63/1416 (2013.01)

(58) Field of Classification Search
CPC .................................................... H04L 63/1416
(Continued)

(56) References Cited

U.S. PATENT DOCUMENTS

| | | |
|---|---|---|
| 8,375,450 B1 | 2/2013 | Oliver |
| 8,661,547 B1 * | 2/2014 | Kononov ............. G06F 16/122 |
| | | 713/176 |

(Continued)

FOREIGN PATENT DOCUMENTS

| | | | |
|---|---|---|---|
| CN | 119563303 A * | 3/2025 | ........... H04L 63/029 |

OTHER PUBLICATIONS

ACM—Association for Computing Machinery, IWCTS 2009, Proceedings of The Second International Workshop on Computational Transportation Science in Conjunction with ACM SIGSPATIAL GIS 2009, Nov. 3, 2009.
(Continued)

*Primary Examiner* — Hamza N Algibhah
(74) *Attorney, Agent, or Firm* — Van Pelt, Yi & James LLP

(57) ABSTRACT

Techniques for a data centric approach for supporting multiple inline cloud services are disclosed. In some embodiments, a system, a process, and/or a computer program product for a data centric approach for supporting multiple inline cloud services includes processing a set of data for network security analysis; determining whether to offload the set of data to a cloud security entity for security processing; and in response to determining to offload the set of data to the cloud security entity, sending the set of data from the inline security entity to a cloud service portal, wherein: the cloud service portal receives a data upload from the inline security entity and processes the data upload to determine content to send to one or more of a plurality of cloud security services for offload processing based on a data type associated with the content; and the cloud service portal receives a result from the one or more of the plurality of cloud security services and forwards the result to the inline security entity, wherein the inline security entity performs an action based on a security policy associated with the inline security entity.

20 Claims, 17 Drawing Sheets

(51) Int. Cl.
 *H04L 9/40* (2022.01)
 *H04L 29/06* (2006.01)
(58) Field of Classification Search
 USPC .......................................................... 726/23
 See application file for complete search history.

(56) References Cited

U.S. PATENT DOCUMENTS

| | | | |
|---|---|---|---|
| 9,043,894 B1 | 5/2015 | Dennison | |
| 9,756,061 B1 | 9/2017 | Roeh | |
| 9,805,193 B1* | 10/2017 | Salsamendi | G06F 21/566 |
| 9,894,578 B1* | 2/2018 | Jawaharlal | H04L 67/10 |
| 10,169,579 B1 | 1/2019 | Xu | |
| 10,225,137 B2* | 3/2019 | Jain | H04L 67/14 |
| 10,452,993 B1 | 10/2019 | Hart | |
| 10,897,480 B2 | 1/2021 | Grubel | |
| 11,323,454 B1* | 5/2022 | Li | H04L 63/0421 |
| 11,468,185 B2 | 10/2022 | Hayes | |
| 11,611,571 B2 | 3/2023 | Lindquist | |
| 11,818,134 B1* | 11/2023 | Gibson | H04L 63/102 |
| 11,880,460 B2 | 1/2024 | Sevcenko | |
| 12,067,115 B2 | 8/2024 | Kulaga | |
| 12,346,236 B2* | 7/2025 | Yamato | G06F 11/3612 |
| 2013/0347075 A1* | 12/2013 | Narendra | G06F 21/31 726/4 |
| 2014/0105103 A1* | 4/2014 | Nethi | H04W 12/03 370/328 |
| 2014/0189267 A1 | 7/2014 | Qi | |
| 2014/0280940 A1* | 9/2014 | Chapman | H04L 63/02 709/225 |
| 2014/0334495 A1* | 11/2014 | Stubberfield | H04L 49/354 370/401 |
| 2015/0134485 A1* | 5/2015 | Kim | H04L 41/5009 705/26.41 |
| 2015/0341230 A1* | 11/2015 | Dave | G06Q 30/0201 705/7.29 |
| 2015/0341235 A1 | 11/2015 | Ni | |
| 2016/0019636 A1* | 1/2016 | Adapalli | G06Q 30/0635 705/26.81 |
| 2016/0373325 A1 | 12/2016 | Shanks | |
| 2017/0310703 A1 | 10/2017 | Ackerman | |
| 2018/0115525 A1* | 4/2018 | Chou | H04L 67/568 |
| 2018/0324201 A1 | 11/2018 | Lowry | |
| 2020/0076835 A1 | 3/2020 | Ladnai | |

| | | | |
|---|---|---|---|
| 2020/0099549 A1* | 3/2020 | Gummadidala | H04L 12/2856 |
| 2020/0210581 A1* | 7/2020 | Salsamendi | G06F 21/562 |
| 2020/0259792 A1 | 8/2020 | Devarajan | |
| 2021/0060426 A1* | 3/2021 | Baca | A63F 13/795 |
| 2021/0158199 A1 | 5/2021 | Heckey | |
| 2021/0382808 A1 | 12/2021 | Zhang | |
| 2022/0006805 A1* | 1/2022 | Kulkarni | H04L 63/0236 |
| 2022/0014602 A1* | 1/2022 | Sai Sampath | H04L 63/0272 |
| 2022/0067146 A1 | 3/2022 | Cai | |
| 2022/0103525 A1* | 3/2022 | Shribman | G06F 16/9574 |
| 2022/0131879 A1 | 4/2022 | Naik | |
| 2022/0155992 A1 | 5/2022 | Nortman | |
| 2022/0239508 A1* | 7/2022 | Liu | H04L 9/50 |
| 2022/0318097 A1 | 10/2022 | Quan | |
| 2022/0374294 A1 | 11/2022 | Van Der Merwe | |
| 2022/0417332 A1* | 12/2022 | Chiganmi | H04L 67/141 |
| 2023/0039584 A1* | 2/2023 | Luo | H04L 63/101 |
| 2023/0110404 A1* | 4/2023 | Raj Susairaju | H04M 3/51 379/201.01 |
| 2023/0125134 A1 | 4/2023 | Raleigh | |
| 2023/0169181 A1* | 6/2023 | Bargury | G06F 21/566 726/1 |
| 2023/0300114 A1 | 9/2023 | Bhallamudi | |
| 2024/0040378 A1* | 2/2024 | John Thomas | H04W 4/14 |
| 2024/0152401 A1 | 5/2024 | Naseem | |
| 2024/0196191 A1* | 6/2024 | Lu | H04L 67/02 |
| 2024/0250970 A1* | 7/2024 | Lai | H04L 63/1416 |
| 2024/0291816 A1* | 8/2024 | Hulick | H04L 63/0876 |
| 2025/0117482 A1 | 4/2025 | Timothy | |
| 2025/0141886 A1 | 5/2025 | Lai | |
| 2025/0141894 A1 | 5/2025 | Yang | |
| 2025/0193250 A1* | 6/2025 | Patnala | H04L 41/0895 |

OTHER PUBLICATIONS

Inagaki et al., Prioritization of Mobile IoT Data Transmission Based on Data Importance Extracted From Machine Learning Model, Special Section on Intelligent and Cognitive Techniques for Internet of Things, IEEE Access, vol. 7, 2019, pp. 93611-93620.
Saeed et al., Towards Optimizing WLANs Power Saving: Novel Context-Aware Network Traffic Classification Based on a Machine Learning Approach, IEEE Access, vol. 7, 2019, pp. 3122-3135.
Shinkuma et al., Data Assessment and Prioritization in Mobile Networks for Real-Time Prediction of Spatial Information using Machine Learning, EURASIP Journal on Wireless Communications and Networking, 2020, pp. 1-19.

\* cited by examiner

100

WIF client Architecture

FIG. 6

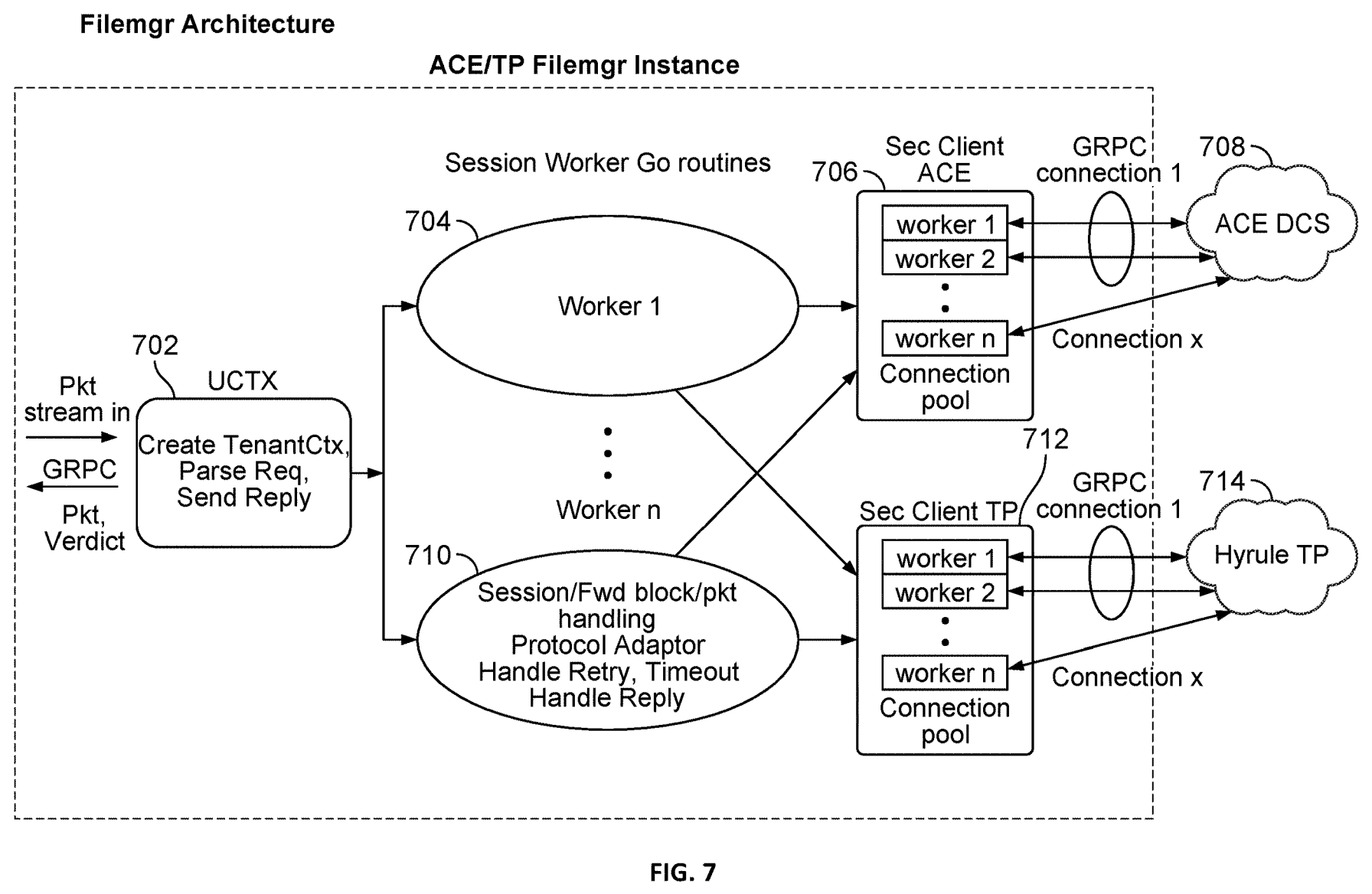

Filemgr Architecture

ACE/TP Filemgr Instance

708 — ACE DCS

714 — Hyrule TP

GRPC connection 1

Connection x

GRPC connection 1

Connection x

Sec Client ACE — 706 worker 1 | worker 2 | • • • | worker n
Connection pool

Sec Client TP — 712 worker 1 | worker 2 | • • • | worker n
Connection pool

Session Worker Go routines

Worker 1 — 704

• • • •

Worker n

Session/Fwd block/pkt handling
Protocol Adaptor
Handle Retry, Timeout
Handle Reply — 710

UCTX

702 — Create TenantCtx,
Parse Req,
Send Reply

Pkt stream in
GRPC
Pkt, Verdict

FIG. 7

| ATP Detection Service | Module | Sub Module | Service/ Detect ID (New) | Data Type | Data Block Types | Release |
|---|---|---|---|---|---|---|
| cs-hd-http-cs | 1 (C2) | 4 | 11 | [1000] | [2, 6] | Equinox |
| cs-hd-http-ss | 1 (C2) | 2 | 9 | [7] | [7] | Equinox |

FIG. 9D admin@rguan-vm-56> debug dataplane show ctd feature-forward forward-info session-id 127

Figure 9E:
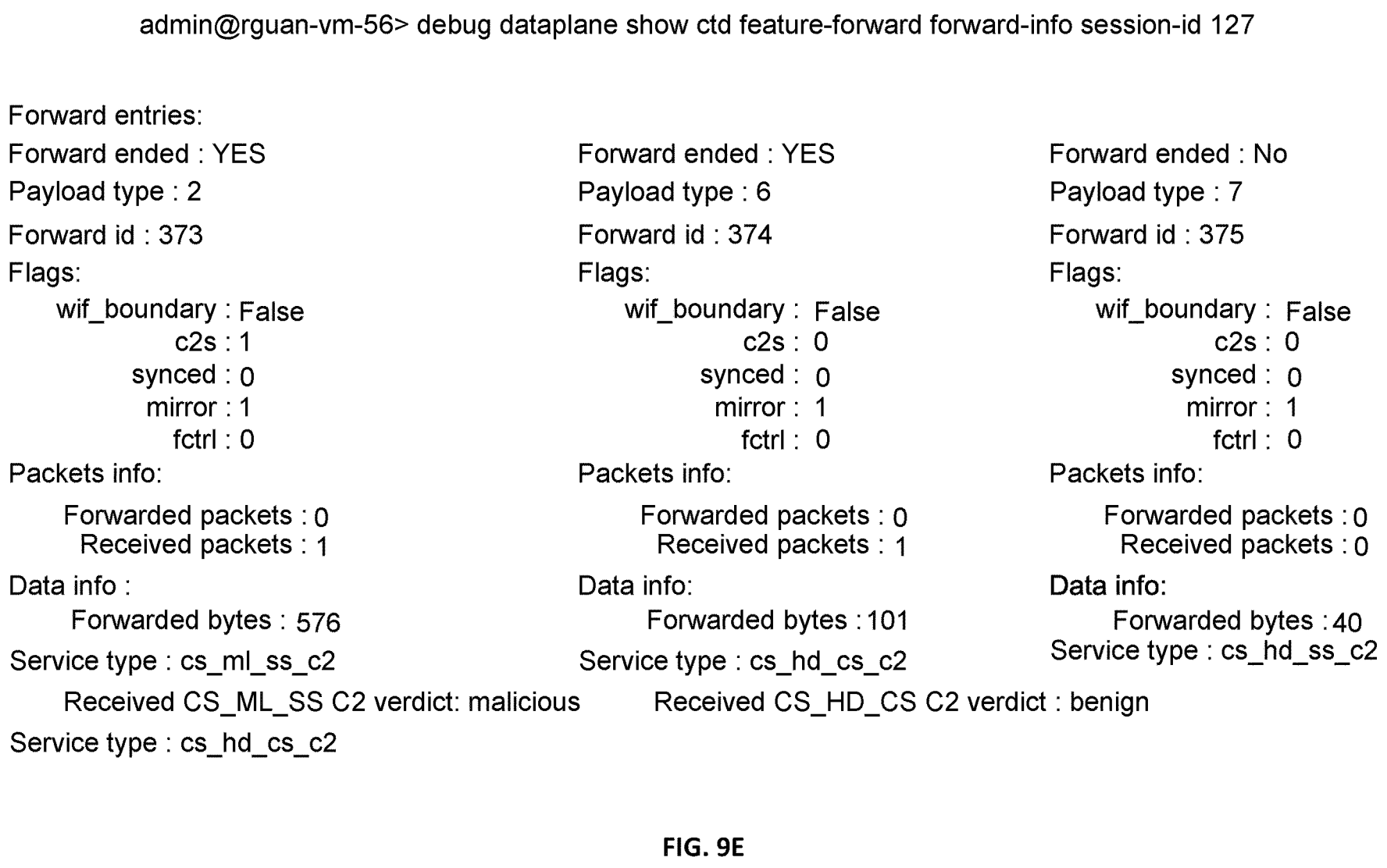

Forward entries:
Forward ended : YES
Payload type : 2
Forward id : 373
Flags:
    wif_boundary : False
        c2s : 1
        synced : 0
        mirror : 1
        fctrl : 0
Packets info:
    Forwarded packets : 0
    Received packets : 1
Data info :
    Forwarded bytes : 576
Service type : cs_ml_ss_c2
    Received CS_ML_SS C2 verdict: malicious
Service type : cs_hd_cs_c2

Forward ended : YES
Payload type : 6
Forward id : 374
Flags:
    wif_boundary : False
        c2s : 0
        synced : 0
        mirror : 1
        fctrl : 0
Packets info:
    Forwarded packets : 0
    Received packets : 1
Data info:
    Forwarded bytes :101
Service type : cs_hd_cs_c2
    Received CS_HD_CS C2 verdict : malicious Forward ended : No
Payload type : 7
Forward id : 375
Flags:
    wif_boundary : False
        c2s : 0
        synced : 0
        mirror : 1
        fctrl : 0
Packets info:
    Forwarded packets : 0
    Received packets : 0
Data info:
    Forwarded bytes :40
Service type : cs_hd_ss_c2

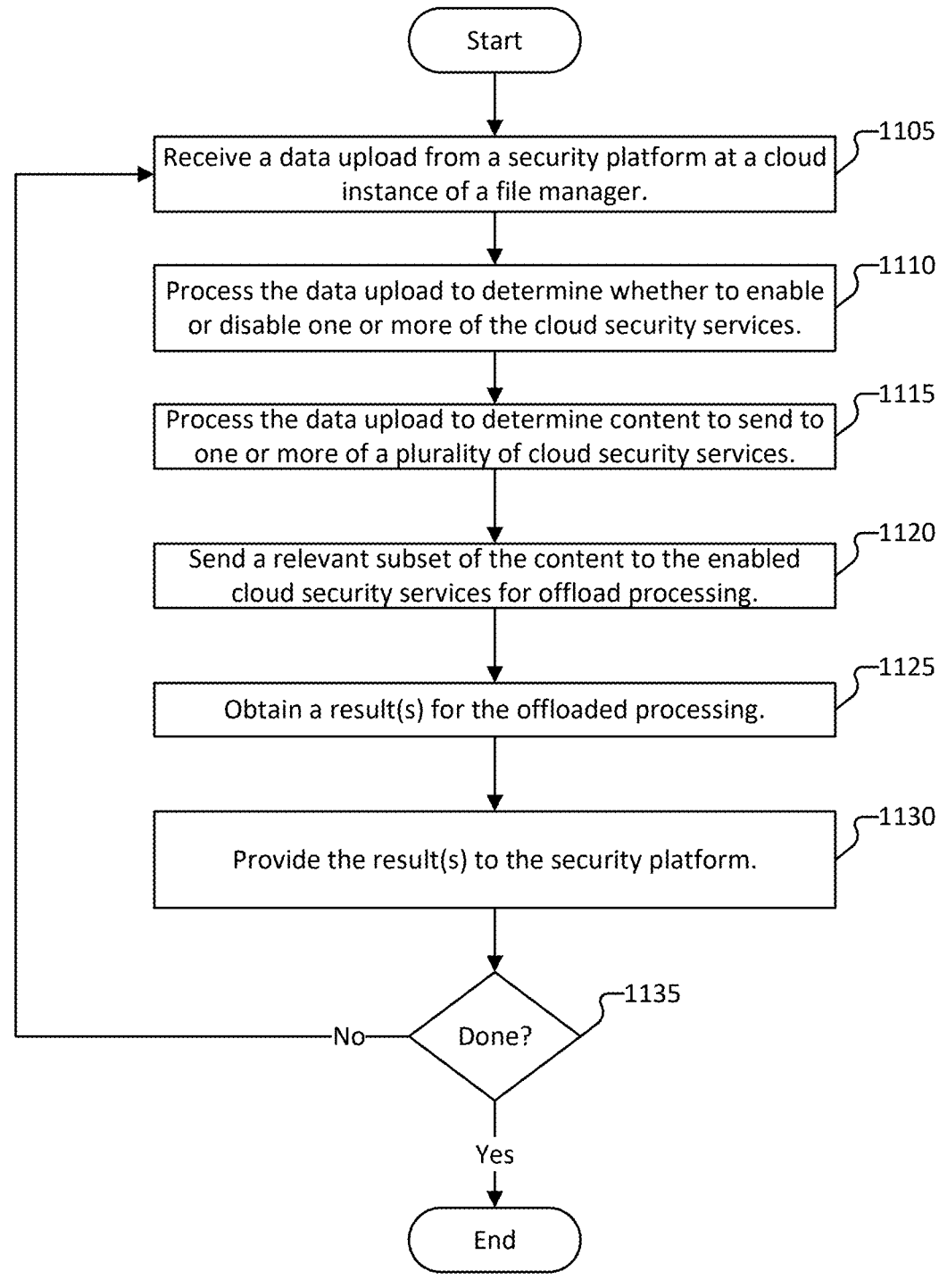

Start

Receive a data upload from a security platform at a cloud instance of a file manager. ⌐1105

Process the data upload to determine whether to enable or disable one or more of the cloud security services. ⌐1110

Process the data upload to determine content to send to one or more of a plurality of cloud security services. ⌐1115

Send a relevant subset of the content to the enabled cloud security services for offload processing. ⌐1120

Obtain a result(s) for the offloaded processing. ⌐1125

Provide the result(s) to the security platform. ⌐1130

Done? ⌐1135

No

Yes

End

DATA CENTRIC APPROACH FOR SUPPORTING MULTIPLE INLINE CLOUD SERVICES

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIG. 6 is a block diagram of a WIF client architecture for providing a data centric approach for supporting multiple inline cloud services in accordance with some embodiments.

FIG. 7 is a block diagram of a file manager architecture for providing a data centric approach for supporting multiple inline cloud services in accordance with some embodiments.

FIG. 9D is another diagram of a format for WIF messages between a security platform and a file manager that utilizes common payload types for providing a data centric approach for supporting multiple inline cloud services in accordance with some embodiments.

FIG. 9E is a forward cache example for providing a data centric approach for supporting multiple inline cloud services in accordance with some embodiments.

FIG. 11 is a flow diagram of a process for a data centric approach for supporting multiple inline cloud services in accordance with some embodiments.

DETAILED DESCRIPTION

Figure 1:
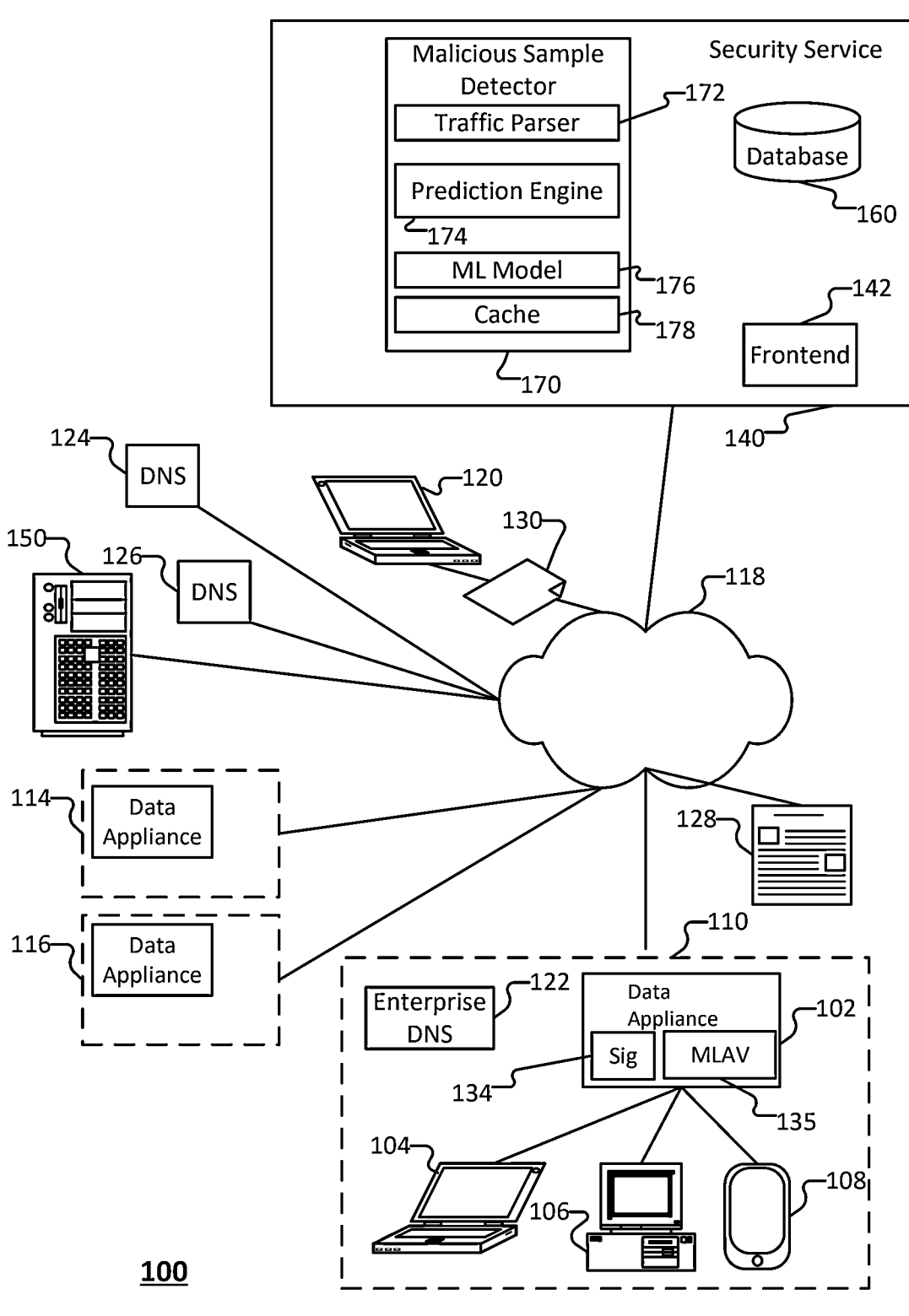
FIG. 1 is a block diagram of an environment in which a malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper- Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content not just ports, IP addresses, and packets-using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Cloud-Based Security Service Providers

Security service providers offer various commercially available cloud-based security solutions including various firewall, VPN, and other security related services. For example, some security service providers have multiple inline cloud detection services (e.g., URL category services, application identification (ID) services, malware sample analysis services, etc.) to provide their customers such cloud-based security solutions.

As the number of inline cloud detection services increases, the same payload generally is sent to multiple inline cloud services at the same time.

However, if one upload connection is used per inline cloud detection service, then various technical challenges arise as a result of using a separate upload connection for each of a plurality of inline cloud detection services to send the same payload for security analysis.

Examples of some of the issues that arise due to this approach will now be briefly discussed below.

First, such an approach increases the cost for such connections.

Second, such an approach typically results in a higher latency for waiting for the verdict from each cloud detection service.

Third, such an approach can result in a data leak if two inline services share only partial payload-type data.

As such, new and improved solutions are needed for cloud-based security service providers.

Overview of Techniques for a Data Centric Approach for Supporting Multiple Inline Cloud Services Accordingly, various techniques for a data centric approach for supporting multiple inline cloud services are disclosed. For example, various techniques for a data centric approach for supporting multiple inline cloud-based security services (e.g., example cloud detection services can include URL category services, application identification (ID) services, malware sample analysis services, etc.) are disclosed.

In an example implementation, a security platform (e.g., a data plane of a network gateway firewall (NGFW) or other security platform) can use a single upload connection to a cloud service portal (e.g., a file manager (filemgr) component). The cloud service portal can then use a connection to each of the cloud detection services (e.g., via distinct GRPC connections) to upload data (e.g., the payload) from the security platform to each of the relevant cloud detection services. In this example, the payload sent from the data plane of the security platform is shared for all enabled cloud detection services (e.g., an enterprise customer can have subscriptions for a plurality of such cloud detection services for the security platform).

In some embodiments, a system, a process, and/or a computer program product for a data centric approach for supporting multiple inline cloud services includes processing a set of data for network security analysis; determining whether to offload the set of data to a cloud security entity for security processing; and in response to determining to offload the set of data to the cloud security entity, send the set of data from the inline security entity to a cloud service portal, wherein: the cloud service portal receives a data upload from the inline security entity and processes the data upload to determine content to send to one or more of a plurality of cloud security services for offload processing based on a data type associated with the content; and the cloud service portal receives a result from the one or more of a plurality of cloud security services and forwards the result to the inline security entity, wherein the inline security entity performs an action based on a security policy associated with the inline security entity.

In an example implementation, the inline security entity sends the set of data to the cloud service portal using a single channel of communication (e.g., using a remote procedure call, such as gRPC). The cloud service portal can be implemented using a cloud instance of a file manager as further described below. The set of data is sent from the shared memory of the inline security entity to the cloud service portal by a data plane of the inline security entity. The data plane uses a connector service associated with the service or type of processing that is offloaded to the cloud security entity. The system of claim 1, wherein the cloud service portal determines the cloud service to which to assign the set of data based on a table included in the set of data, wherein the table includes a service mapping table that specifies a module and/or submodule and a payload type table. The set of data is received from another cloud instance (e.g., a WIF client as further described below) that is in communication with the inline service entity. The set of data can include a payload that is sent from the cloud service portal to a plurality of cloud security services. The cloud service portal can be configured to process the set of data using an inline mode, a hold mode, and/or a mirror mode. The cloud service portal can also process the set of data to determine whether to enable or disable one or more of the cloud security services (e.g., based on a function call or a triggered signature as further described below) to facilitate a content-driven adding or removing of cloud security services. The plurality of cloud security services can include one or more of the following: a data loss prevention (DLP) service, an Internet of Things (IoT) service, an application cloud engine (ACE) service, and a URL category (URLCAT) service.

As such, the disclosed techniques for a data centric approach for supporting multiple inline cloud services avoid the complicated synchronization for using multiple upload connections to different detection services.

Moreover, the disclosed techniques for a data centric approach for supporting multiple inline cloud services reduce the complexity of maintaining multiple upload connections.

Further, the disclosed techniques for a data centric approach for supporting multiple inline cloud services reduce the computational/bandwidth costs associated with the uploading operations from security platforms to cloud detection services.

These and various other techniques for a data centric approach for supporting multiple inline cloud services will now be further described below with respect to various embodiments.

Example System Embodiments for a Data Centric Approach for Supporting Multiple Inline Cloud Services As used herein, a security platform or an inline security entity/platform may include a network node (e.g., a device) that enforces one or more security policies with respect to information such as network traffic, files, etc. As an example, a security platform or an inline security entity/platform may be a firewall. As another example, a security platform or an inline security entity/platform may be implemented as a router, a switch, a DNS resolver, a computer, a tablet, a laptop, a smartphone, etc. Various other devices may be implemented as a security platform or an inline security entity/platform. As another example, a security platform or an inline security entity/platform may be implemented as an application running on a device, such as an anti-malware application. As another example, a security platform or an inline security entity/platform may be implemented as an application running on a container or a virtual machine (VM).

According to some related art systems, a task is communicated to another system (e.g., a cloud system/service) via a management plane. A cloud service generally has more resources and greater processing power. Thus, local systems are often designed to offload at least some information or tasks to the cloud service (e.g., to preserve computational resources, storage, etc. on the local systems). For example, local systems are generally designed to offload to a cloud service the heavy compute process activities (e.g., examples of compute intensive operations can include applying various machine learning techniques (MLT) for malware sample analysis, etc.). The local system may perform low latency services but will offload certain processing operations to the cloud service. The related art local system comprises a data plane on which a plurality of applications is running and a management plane that facilitates communications between the plurality of applications and another system, such as a cloud service (e.g., a cloud detection service).

However, as similarly discussed above, such related art systems are typically inefficient, because the management plane serves as a bottleneck. For each communication between the related art system and the cloud system, the data plane of the related art system sends a communication (e.g., the task) to the management plane, which in turn sends the communication to the cloud system. Thus, the communication of the task from the related art system to the cloud system requires two communications/hops.

To solve such inefficiencies of the related art systems that mediate communications between the data plane of a local system and a cloud service to which the process running on the data plane offloads information or tasks, other related art systems include a shared memory to facilitate inter-process communications (e.g., communication of messages, such as messages corresponding to tasks). A plurality of tasks (e.g., applications) running on the system use a shared memory, such as to communicate with another process (e.g., a daemon running on a data plane of the system to facilitate communication with another system, such as a cloud service). For example, the plurality of tasks respectively writes request messages to a shared memory, and the daemon retrieves the request message and communicates with the cloud service. As another example, in response to receiving a response message (also referred to herein as a result message), the daemon writes the response message to the shared memory and the applicable task may read the response message from the shared memory. Some related art systems may comprise a forward-direction shared memory and a reverse direction shared memory for facilitating communication of data (e.g., messages) from the data plane of the local system to the other system (e.g., the cloud service).

As used herein, a forward direction shared memory may include a memory in which messages (e.g., request messages) are written by one or more of the applications for reading by a process (e.g., a daemon, also referred to herein as the WIFClient) running on a data plane of the system on which the plurality of applications is executed (e.g., an inline security entity). The process (e.g., the daemon) may be responsible for transferring the messages from the system (e.g., the messages generated by the plurality of applications) to a cloud system (e.g., a cloud security entity), and to receive the verdict (e.g., a result of the message from the cloud system and provide the verdict to the corresponding application of the plurality of applications (e.g., the application that wrote the message to the forward direction shared memory)).

As will be further described below with respect to various embodiments, the WIFClient is a component that facilitates communication via a single communication channel with the shared file manager (e.g., FileMgr service, such as further described below with respect to various embodiments) that can then efficiently utilize distinct channels for communications with each of the cloud detection services for performing the disclosed techniques for a data centric approach for supporting multiple inline cloud services.

As used herein, a reverse direction shared memory may include a memory in which messages (e.g., result messages) are written by the process running on the data plane of the system on which the plurality of applications is executed (e.g., the inline security entity). The process may be responsible for receiving the verdict (e.g., a result of the message from the cloud system) and provide the verdict to the corresponding application of the plurality of applications (e.g., the application that wrote the message to the forward direction shared memory). The process provides the verdict to the corresponding application by writing a corresponding message to the reverse direction shared memory, and the corresponding application may receive the verdict based on a reading of the reverse direction shared memory.

According to various embodiments, the plurality of applications may be written or compiled in different programming languages. At least a subset of the plurality of applications provides corresponding local services at a system (e.g., an inline security entity), and the local services are configured to offload tasks to a cloud service (e.g., a cloud system that provides a plurality of corresponding cloud services). For example, tasks that write request messages to the shared memory (e.g., the forward-direction shared memory) may be written in C, and the application that retrieves the request message from the shared memory and facilitates communication with the cloud service may be written in the Go programming language (also referred to herein as Golang). The use of a shared memory in connection with communicating requests from the data plane to the cloud service provides a more seamless manner for passing messages from applications written in a first language to applications written in a second language. For example, developers are freed from having to develop interfaces by which the applications communicate with one another.

Because a plurality of local services (e.g., running at the inline security entity) write tasks (e.g., request messages) to the multi-application shared-memory (e.g., the forward-direction shared memory), the memory constraints of the shared-memory can cause the process (e.g., the application) that retrieves the request message from the shared memory and facilitates communication with the cloud service to be overloaded. According to various embodiments, the system enforces a quota for data that a particular local service can write to the shared memory. Each local service may have its own corresponding quota, or various subsets of local services may be grouped and share a group quota for the particular group/subset of local services.

In some embodiments, an inline security entity (e.g., a security platform, such as an NGFW/firewall) has a plurality of processes (e.g., tasks, applications, etc.) running thereon, which respectively correspond to services provided by the cloud service entity. For example, each service running on the cloud service entity corresponds to (e.g., services) a service running at the inline security entity. The inline security entity determines whether to offload processing of certain data to the cloud service entity. For example, the inline security entity determines an extent to which data processing is to be performed locally or offloaded for processing to the cloud service entity. The inline security entity is configured to perform, for example, low latency services, and offloads processing for compute intensive services (e.g., if processing data is to exceed a predefined processing threshold, the processing is offloaded; or if the type of processing data matches processing that is mapped to the cloud service entity, the processing is offloaded; etc.). In response to determining to offload processing certain data to the cloud service entity, the service running on the inline security entity writes a message (e.g., a request for the data to be processed by the cloud service entity) to the multi-application shared memory.

In some embodiments, the multi-application shared memory(ies) (e.g., the forward direction shared memory, the reverse direction shared memory, etc.) are a ring buffer.

According to various embodiments, one or more data planes of the inline security entity are configured to communicate with the cloud service. For example, a data plane communicates directly with the cloud service entity, or otherwise communicates with the cloud service entity in a manner that does not require the management plane to communicate data processing requests (e.g., request messages) to the cloud service entity. The system thus reduces latency by relying on the data plane to connect to the cloud (e.g., the WIFClient that is in communication with the FileMgr that then communicates with each of the cloud detection services using distinct communication channels, such as will be further described below).

The inline security entity receives data from another system or service. For example, the inline security entity comprises/corresponds to a security platform/firewall that mediates traffic across a network. In some embodiments, the inline security entity has a cache that may be used to support inline processing (e.g., local processing at the inline security entity) of the data (e.g., the traffic data). For example, the system may use the cache in connection with storing models, previously detected patterns/fingerprints, or other store results from processing traffic such as results previously computed inline, or verdicts (e.g., results) received from the cloud service entity. In response to receiving data, the system (e.g., the inline security entity) queries its cache to determine whether the cache has sufficient information available for the system to perform local processing of the data (e.g., low-latency computes with respect to such data). For example, the system determines whether the cache stores a mapping (e.g., a blacklist) of fingerprint (or hash) to malicious files (or malicious traffic) that includes the characteristics of the data received and being locally analyzed by the system. As another example, the system determines whether the cache stores a mapping (e.g., a whitelist) of fingerprint (or hash) to benign files (or malicious traffic) that includes the characteristics of the data received and being locally analyzed by the system. If the mapping(s) in the cache do not store a fingerprint for the data being analyzed, the system determines whether to offload processing (e.g., analysis of whether the traffic is malicious) to the cloud service. In some embodiments, the determination of whether to offload processing to the cloud service is performed at the data plane(s) of the system (e.g., the inline security entity), and the tasks running on the data plane(s) connect to the cloud service to request the service and receive the verdict.

In response to receiving the request message from the data plane of the local system, a process running on the cloud-side architecture determines the service that the request message pertains to. For example, the cloud service (e.g., cloud security service or also referred to herein as security service) determines the service/processing to be performed at the cloud service based on the request message (e.g., the task/process from which the request message originated). The cloud service may determine the service/processing to be performed based on the connector (e.g., the connection interface between the data plane(s) of the local system and the cloud service) via which the request message was received. In response to determining the service/processing to be performed with respect to data for the request message, the cloud service obtains the data, allocates the processing to a worker, and the worker connects to a back-end service to perform the processing. In response to the processing being completed by the cloud service, the cloud service sends a verdict of the processing to the other system (e.g., the inline security entity). The verdict may be a result or response message corresponding to the request message. In some embodiments, the cloud security entity sends to the inline security entity an update for the inline security entity to store in its cache. For example, the cloud security entity sends to the inline security entity a signature for the data that was processed and a corresponding verdict (e.g., an indication of whether the data is malicious traffic or benign traffic, etc.). Upon update of the cache at the inline security entity, the inline security entity may use such information in connection with processing subsequent data (e.g., traffic) matching the signature associated with the update.

In some embodiments, the system comprises a plurality of shared memories. For example, the system comprises a first buffer that provides an indication of whether a message (e.g., a request message) is available for processing, and a second buffer that provides a message queue. The system uses indexes for the shared memories in connection with flow control, such as to ensure that the reader side (e.g., the daemon running on the data plane and facilitating communication with the cloud system) is not overwhelmed by request messages from the plurality of applications running on the data plane(s). The flow control of messages/requests may be facilitated by using metadata counters.

In connection with the process/task (e.g., the message writer) requesting service from the cloud system writing a request message into the shared memory, the system increases a message-in index (e.g., the write index) counter. The system uses the message-in index counter in connection with determining whether a request message is to be written into the shared memory or whether the message-reader side is overwhelmed with a volume of requests from the processes/tasks (e.g., applications) that share the shared memory. For example, if the message-reader side is too slow in processing the request messages, the buffer of request messages in the queue may become full/used up. The write index indicates the total number of messages in the buffer.

In connection with processing the request messages written to the shared memory, the system increases a message-out index (e.g., the read index) counter in response to the process on the reader-side of the shared memory (e.g., the daemon, such as the WIFClient) reading the request message. For example, the reading of the request message by the process on the message-reader side is deemed to be indicative of the system having processed the request message and offloaded the processing to the cloud system. The system uses the message-out index counter in connection with determining whether a request message is to be written into the shared memory or whether the message-reader side is overwhelmed with a volume of requests from the processes/tasks (e.g., applications) that share the shared memory.

In some embodiments, the system uses the message-out index counter and the message-in index counter to determine whether to process a particular request message. For example, the system uses the message-out index counter and the message-in index counter to determine whether to write the particular request message to the buffer (e.g., the shared memory). The system may compare the message-out index counter and the message-in index counter to determine whether the buffer has sufficient capacity for new request messages. For example, if the difference between the message-in index counter and the message-out index counter is greater than the allocated shared memory (or greater than the number of messages that can be written to the allocated shared memory), then the system (e.g., the message writer task/process) does not write the new request message to the shared memory or the system does not provide or otherwise blocks the corresponding service.

In some embodiments, the various processes (e.g., applications, services, etc.) running on the system that share the shared memory have quotas indicating an amount/number of request messages that the various processes are permitted to have pending in the shared buffer. In some embodiments, each of the plurality of processes have a corresponding quota. In some embodiments, a subset of the plurality of processes are grouped, and each group has a corresponding quota shared among the processes in the particular group. The system stores a message-in index and a message-out index for each process (or group of processes, as applicable). In connection with writing a new request message to the shared memory, the system obtains the message-in index counter and the message-out index counter for the particular process (e.g., or group of processes, as applicable) requesting the service (e.g., requesting to offload the processing to the cloud service) and determines whether the allocated space in the shared memory for the process (e.g., the number of messages that may be written to the shared memory based on the corresponding quota) has sufficient space for the new request message. For example, the system determines the allocated space in the shared memory for a particular process based at least in part on multiplying a predefined number of available spaces for request messages by the quota corresponding to the particular process (or group of processes, as applicable). If the difference between the message-in index counter and the message-out index counter is greater than the product of the available spaces for request messages and the corresponding quota for the particular process, then the allocated space in the shared memory does not have sufficient capacity for new request messages until the message-reader side processes (e.g., reads out) the request messages (e.g., sends the requests to the cloud system for processing). In some implementations, in response to determining that the allocated space in the shared memory does not have sufficient capacity for new request messages, the system restricts writing of new request messages (e.g., the process is controlled to not write a new request message to the shared memory, or a corresponding service is blocked).

In some embodiments, the quotas respectively allocated to various processes sharing the shared memory are different. For example, certain services (e.g., certain processes/applications) may have higher quotas than other services. As an illustrative example, services that process streams of data (e.g., services for which a flow of traffic should not be disrupted), such as DLP services, may have a higher quota than other services. In some embodiments, a DLP service is provided a quota of 50% of the shared memory, and the other 50% of the shared memory is allocated across other services running on the inline security entity.

In some embodiments, the system dynamically adjusts quotas for one or more services (or group of services, as applicable). For example, the system monitors usage of the services and determines whether a particular service has excess or insufficient capacity relative to its usage and adjusts the quota for the particular service accordingly. If the system determines that a particular service has insufficient capacity in the shared memory, the system may determine whether another service has excess capacity which may be re-allocated to the particular service. If the system determines that a particular service has excess capacity in the shared memory relative to its usage, the system determines whether to re-allocate the excess capacity to another service. The system may monitor usage of a service based on monitoring traffic for the service or monitoring the usage of allocated space in the shared memory by the service.

Various embodiments use indexing associated with the shared memory to determine the number of buffered requests pending for the message-reader side (e.g., the daemon running on a data plane of the inline security entity and facilitating communication/offloading of requests to a cloud system). For example, the system uses the indexing to determine how much of the buffer (e.g., how many request messages) has not been consumed by the message-reader side process.

FIG. 1 is a block diagram of an environment in which a malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive (s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 uses security service 140 to perform processing with respect to traffic data off-loaded by data appliance 102. Security service 140 provides one or more services to data appliance 102, client device 120, etc. Examples of services provided by security service 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), and an Internet of Things (IoT) service. Various other services can similarly be implemented, including, for example, Advanced Wildfire (e.g., a commercially available inline machine learning-based engine that prevents malicious content in common file types, which is commercially available from Palo Alto Networks, Inc., headquartered in Santa Clara, CA).

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store blacklists, whitelists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MHLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query a whitelist and/or a blacklist). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjgfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
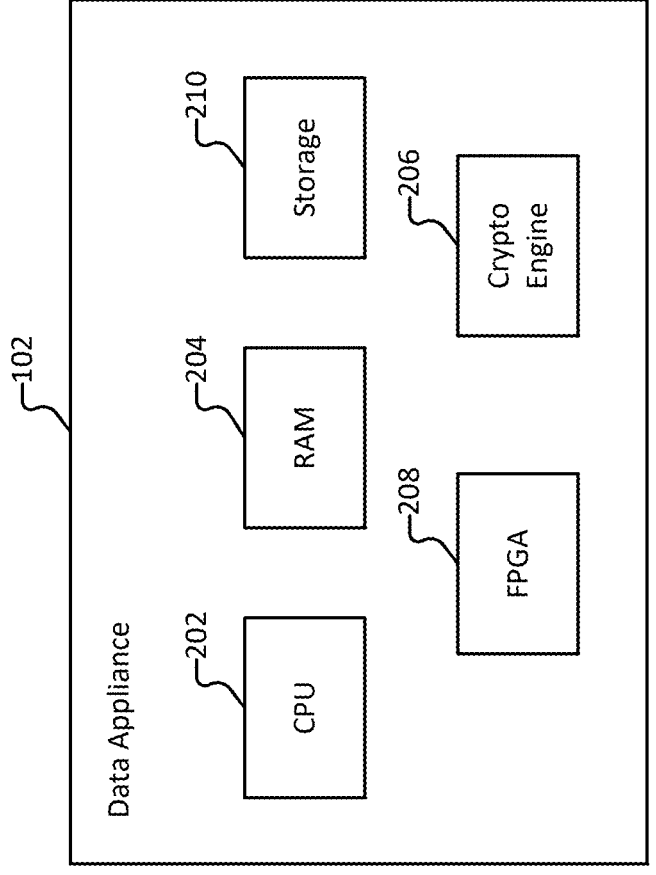
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
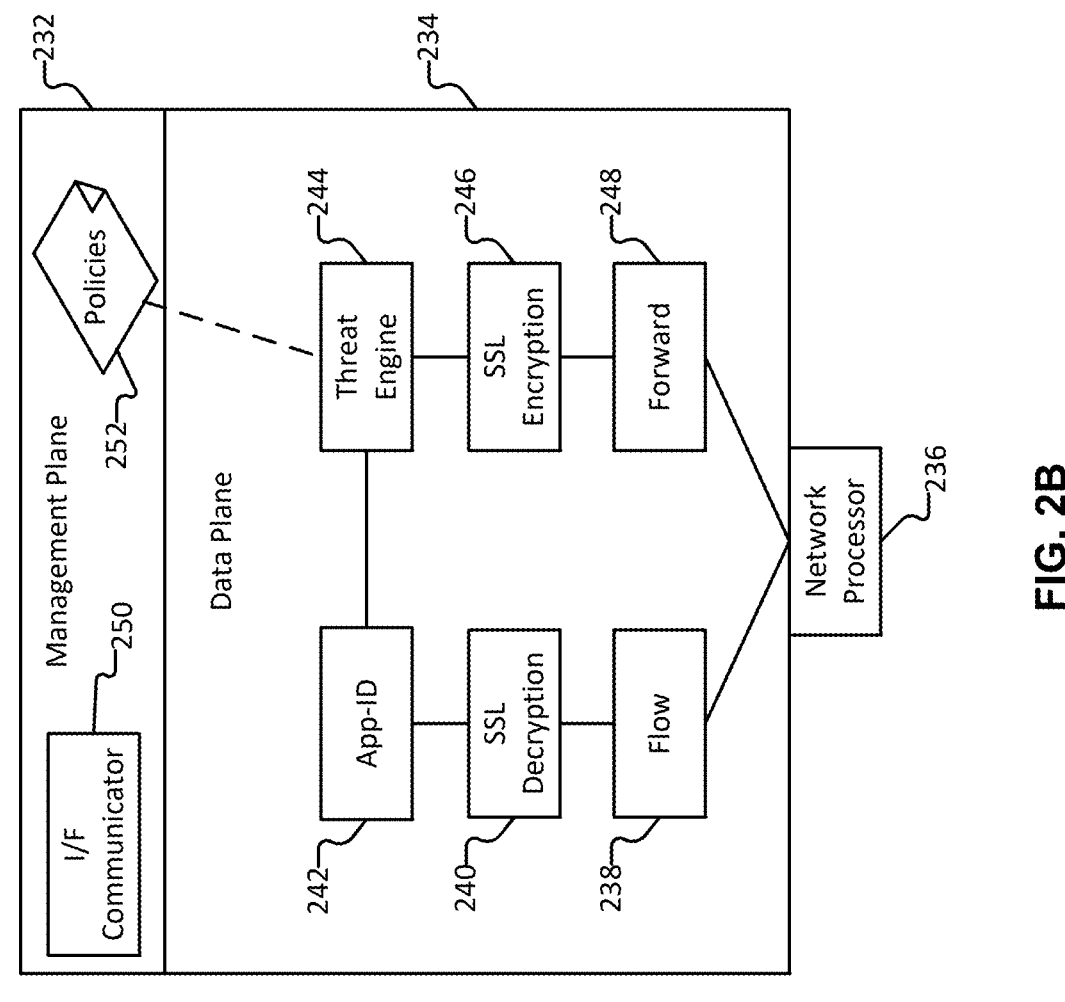
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Various other services may be implemented on data plane 234. The plurality of services/processes running on the data plane(s) of the inline security entity are configured to store request messages in a shared memory, and another process on the data plane (e.g., on a message reader side of the data plane), such as a daemon, reads the message and facilitates communication of the request message to the cloud security entity (e.g., security platform 140 of system 100). As described above, various embodiments enforce quotas with respect to a number of request messages that may be buffered/queued in the shared memory by a service/process running on the data plane of the inline security entity. Enforcing quotas prevents the message-reader side of the data plane(s) of inline security entity to be overwhelmed by request messages written by the plurality of processes to the same shared memory.

The data plane(s) of the inline security entity may connect to the cloud system. For example, the daemon running on the message-reader side of the shared memory (e.g., the WIFClient) connects to a process running on the cloud system (e.g., a file manager service) that receives the request message and determines the service to which the corresponding data is to be provided for cloud processing. For example, the file manager service running on the cloud system directs the data/request message to the corresponding service based on a determination of a connector via which the data plane is connected to the cloud system to communicate the request message to the cloud system, such as will be further described in detail below.

Figure 3:
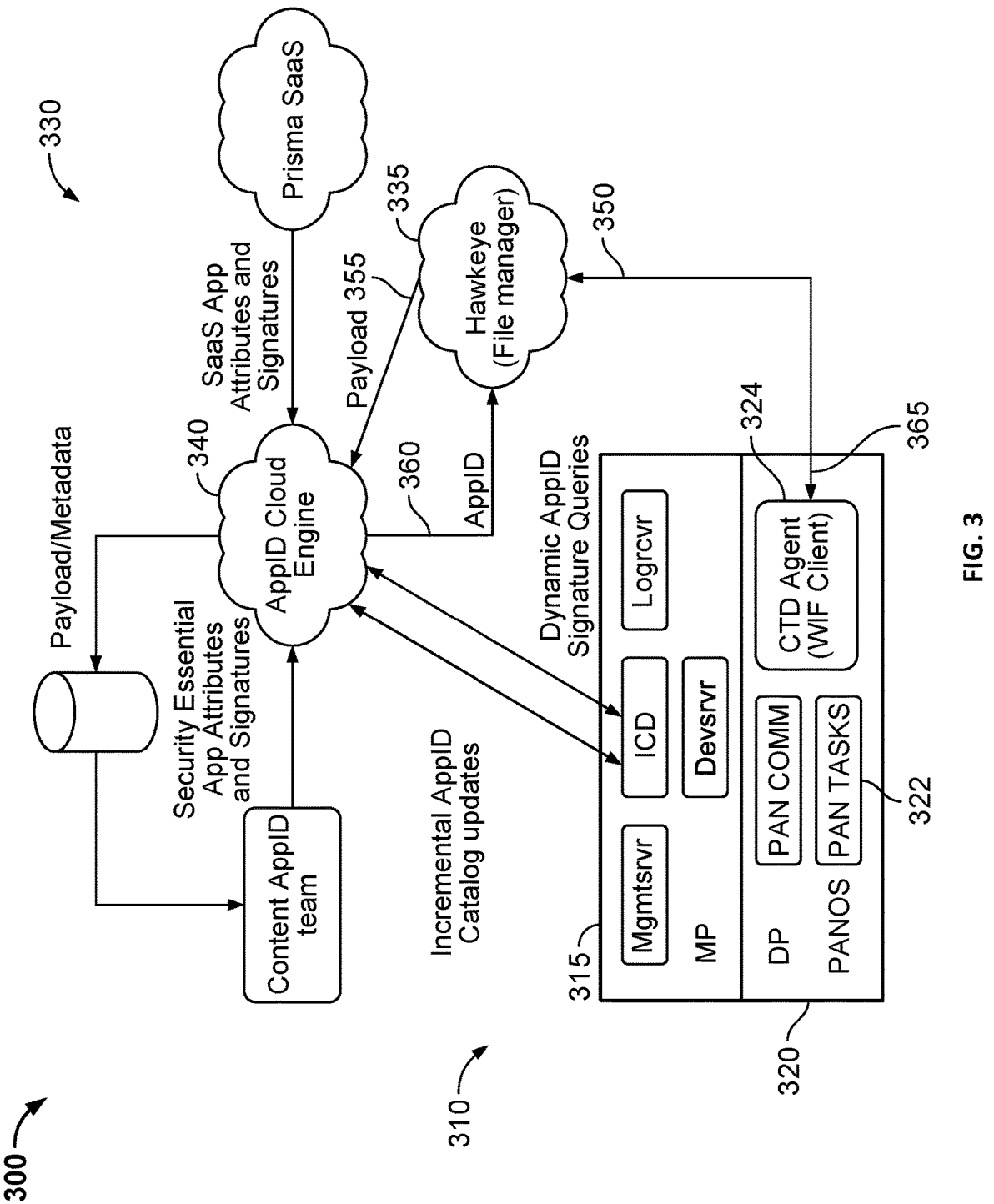
FIG. 3 is a block diagram of an environment in which a security platform offloads services to a cloud system in accordance with some embodiments.

FIG. 3 is a block diagram of an environment in which a security platform offloads services to a cloud system in accordance with some embodiments. In the example shown, a security platform, shown as an inline security entity 310, communicates with cloud system 330 (e.g., associated with a security service). Inline security entity 310 may receive traffic data, such as across a network being monitored/protected, and inline security entity 310 selectively locally processes (e.g., analyzes) the traffic data or offloads processing of the traffic data to cloud system 330.

In some embodiments, inline security entity 310 comprises management plane 315 and data plane 320. Inline security entity 310 may provide a plurality of services, which are shown as PAN tasks 322. The plurality of services may correspond to a plurality of processes or applications running on data plane 320. In response to inline security entity 310 (e.g., the corresponding service) determining to offload processing to cloud system 330 (e.g., the cloud security entity), the corresponding process (e.g., a task of PAN tasks 322) writes a request message to a shared memory (e.g., a local memory to inline security entity 310) that is shared among the plurality of services. In response to the request message being written to the shared memory, a process (e.g., shown as the CTD agent 324 or WIFClient) running on a message-reader side of data plane 320 reads the message and communicates the message to cloud system 330.

In response to reading the request message from the shared memory, the WIFClient (e.g., the daemon process running on data plane 320) connects to cloud system 330. In the example shown, the WIFClient connects to file manager service 335 of cloud system 330. For example, at step 350, the WIFClient communicates the request message to file manager (FileMgr) service 335.

In response to receiving the request message from the WIFClient, file manager service 335 determines the particular service provided by cloud system 330 to which file manager service 335 is to forward the request message for cloud processing, which can be implemented using a data centric approach for supporting multiple inline cloud services as will be further described below with respect to various embodiments. In the example shown, file manager service 335 determines that the data for the request message is to be processed by the APP-ID Cloud Engine (ACE) service 340. The ACE service 340 may identify a particular application to which traffic data corresponds, such as based on a fingerprint of the traffic, etc. In response to determining that the data is to be processed by ACE service 340, at 355, file manager service 335 sends the request message/data to ACE service 340.

In response to receiving the request message from file manager service 335, ACE service 340 processes the data for the request message. For example, ACE service 340 classifies the data to determine an application to which the data corresponds. ACE service 340 may classify the data using a model (e.g., a model trained using machine learning processes) to predict the application. In response to determining the application to which the data corresponds, at 360, ACE service 340 provides file manager service 335 with an indication of the application to which the data corresponds (e.g., an application identifier, or App-ID).

In response to receiving the result (e.g., the verdict) from the processing of the data using ACE service 340, at 365, file manager service 335 provides the result (e.g., a result message) to the inline security entity. For example, file manager service 335 communicates the result to the WIFClient running on 320. In response to receiving the result from file manager service 335, the WIFClient stores information pertaining to the result to a shared memory (e.g., a reverse-direction shared memory), which is shared by the plurality of services (e.g., PAN tasks 322) running on data plane 320. For example, in the case of the reverse-direction shared memory, the WIFClient is the only message writer to the reverse-direction shared memory and the PAN tasks 322 correspond to a plurality of message readers from the reverse-direction shared memory. Because the reverse-shared memory only has one corresponding message writer (e.g., the WIFClient), the plurality of message readers (e.g., PAN tasks 322) are not overwhelmed by the volume of messages. Accordingly, in various embodiments, the reverse-direction communication does not implement quotas or indexing of a number of messages written (e.g., by the WIFClient) to the shared memory or a number of messages read from the shared memory (e.g., by PAN tasks 322).

Figure 4:
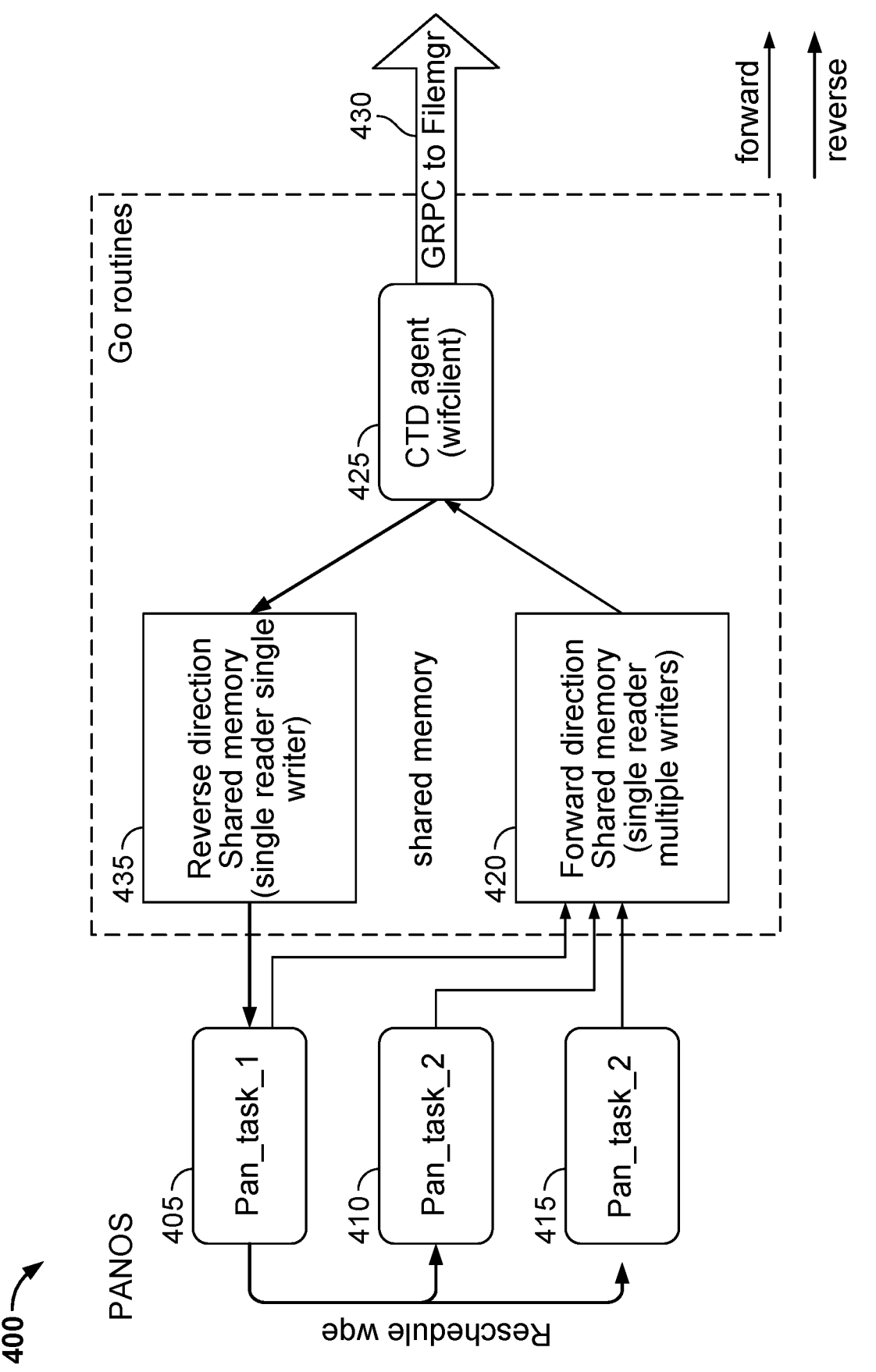
FIG. 4 illustrates a processing of data on a data plane of a security platform in accordance with some embodiments.

FIG. 4 illustrates a processing of data on a data plane of a security platform in accordance with some embodiments. In the example shown, data plane 400 has a plurality of services (e.g., applications) running, including service 405 (e.g., Pan_task_1), service 410 (pan_task_2), and up to service 415 (e.g., Pan_task n). Services 405, 410, and 415 share a shared memory 420 to communicate requests to a cloud system, such as in connection with offloading processing to the cloud system. In some embodiments, data plane 400 has N services that run on data plane 400 and share shared memory 420. N is a positive integer.

As illustrated in FIG. 4, service 405, 410, and 415 write request messages to shared memory 420. Shared memory 420 may also be referred to as the forward-direction shared memory. The system uses shared memory 420 to queue messages for offloading data from a plurality of local services (e.g., service 405, 410, and 415) to a cloud system (e.g., of a security service). As an example, shared memory has a single reader (e.g., WIFClient 425) and multiple writers (e.g., the multiple writers are service 405, 410, and 415).

Data plane 400 further comprises a process (e.g., WIFClient 425) that reads request messages from shared memory 420 and facilitates communication with the cloud system for offloading the processing of the data to the cloud system. WIFClient 425 reads a request message from the queue in shared memory 420 and connects to the cloud system. WIFClient 430 may communicate the request message to the cloud system (e.g., a file manager service running on the cloud system) via a gRPC Remote Procedure Calls (GRPC).

The cloud system processes the data for the request message and communicates a result message (e.g., a verdict) to the inline security entity. In some embodiments, the cloud system provides the result message to WIFClient 425. In response to receiving the result message, WIFClient 425 writes the result message, or information pertaining to the result message, to shared memory 435. Shared memory 435 may also be referred to as the reverse-direction shared memory. In the example shown, shared memory 435 has one message writer (e.g., WIFClient 425) and one message reader (e.g., service 405). In response to WIFClient 425 writing the result message to shared memory 435, service 405 retrieves the result message and forwards the result to the corresponding service. As an example, the result may have associated metadata that indicates the service that requested the processing corresponding to the result, or an identifier associated with the request message from which the system can determine the service from which the request message originated. In some embodiments, services 405, 410, and/or 415 are configured to read the result directly from shared memory 435 (e.g., in which case shared memory 435 has a plurality of message readers).

Figure 5:
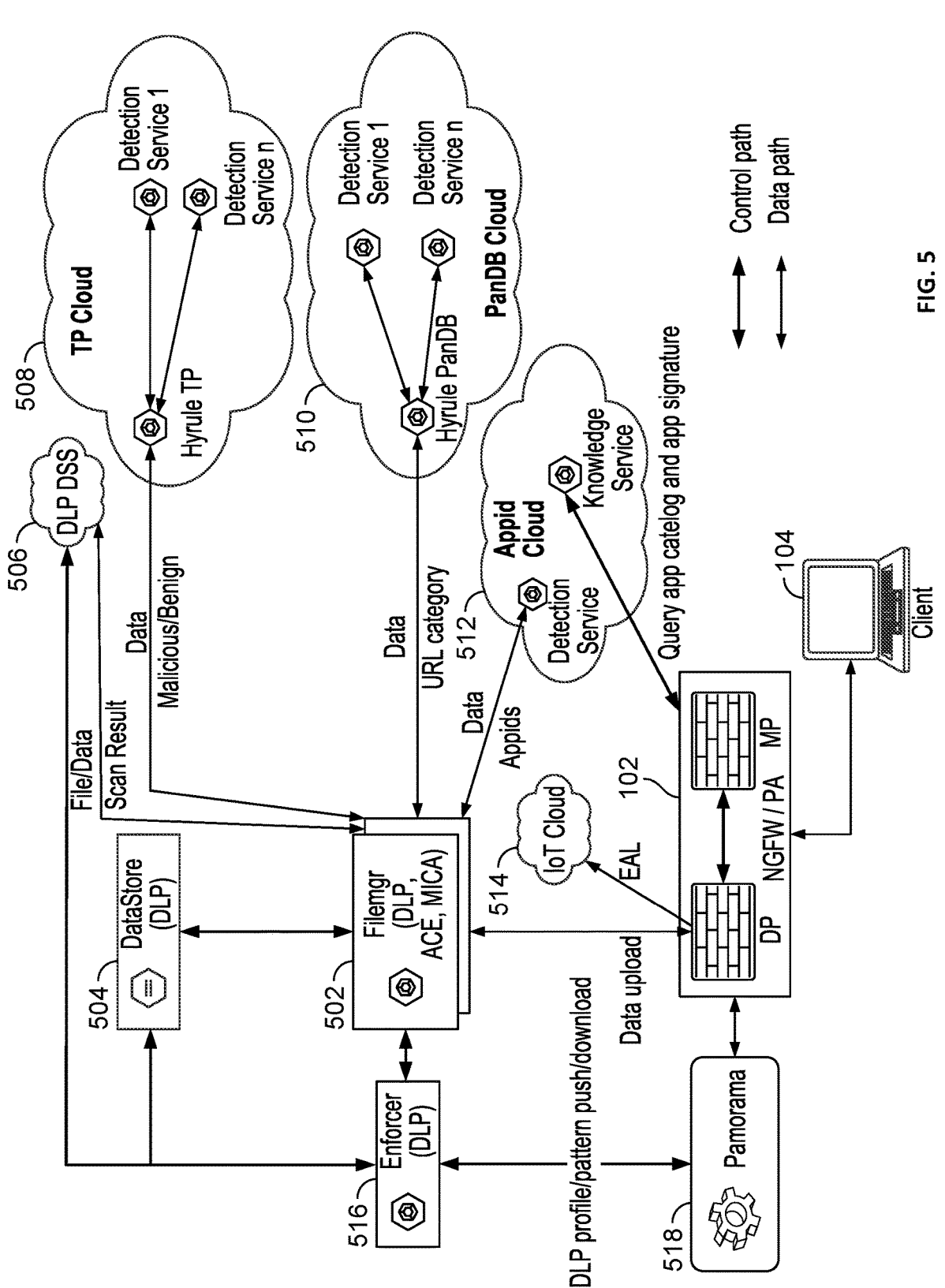
FIG. 5 is a block diagram of a high-level architecture for providing a data centric approach for supporting multiple inline cloud services in accordance with some embodiments.

FIG. 5 is a block diagram of a high-level architecture for providing a data centric approach for supporting multiple inline cloud services in accordance with some embodiments. Referring to FIG. 5, a security platform (e.g., an NGFW/ firewall, such as a commercially available firewall from Palo Alto Networks, Inc., headquartered in Santa Clara, CA, or another commercially available firewall can similarly be used) is shown that includes a data plane (DP) and a management plane (MP). A single data upload channel is shown between the DP of the security platform and a File Manager (FileMgr) 502 (e.g., in which the security platform registers with the File Manager to establish secure communications for performing the disclosed techniques for providing a data centric approach for supporting multiple inline cloud services), which is in communication with a data store (DLP) 504. In this example, the File Manager is in communication with each of the following security detection services: a Data Loss Prevention (DLP) and Data Security Standard (DSS) service as shown at 506, a Threat Prevention (TP) Cloud service as shown at 508, a PanDB Cloud service (e.g., URL category) as shown at 510, and an App-ID Cloud service as shown at 512. As also shown, a DLP Enforcer component 516 is in communication with Data Store (DLP) 504, DLP DSS 506, and a management platform (e.g., Panorama,) as shown at 518, which can be used to manage (e.g., configure, control, update, etc.) the security platform. In this example, the DP of the security platform has a separate communication channel with an Internet of Things (IoT) Cloud detection security service 514 (e.g., in an alternative embodiment, the IoT Cloud detection security service is in communication with the DP of the security platform thru the File Manager as similarly described above with respect to the various other cloud detection security services).

Specifically, in this example implementation, a single data communication channel is provided to a cloud front-end component, shown as File Manager 502. As further described below can be implemented to facilitate advanced decoding, processing, dispatch, and reassembly. This example implementation providing a single data communication channel to the File Manager facilitates a more efficient communication solution for uploading data from the security platform to various detection security services (e.g., providing a limited forwarding bandwidth that allows for the same data to only be sent once to a one or more cloud detection services for advanced analysis and dispatch in the cloud security service). The processing of data performed using the data plane of the security platform can be implemented as similarly described above with respect to FIG. 4 and as will be further described below with respect to various embodiments.

Figure 6:
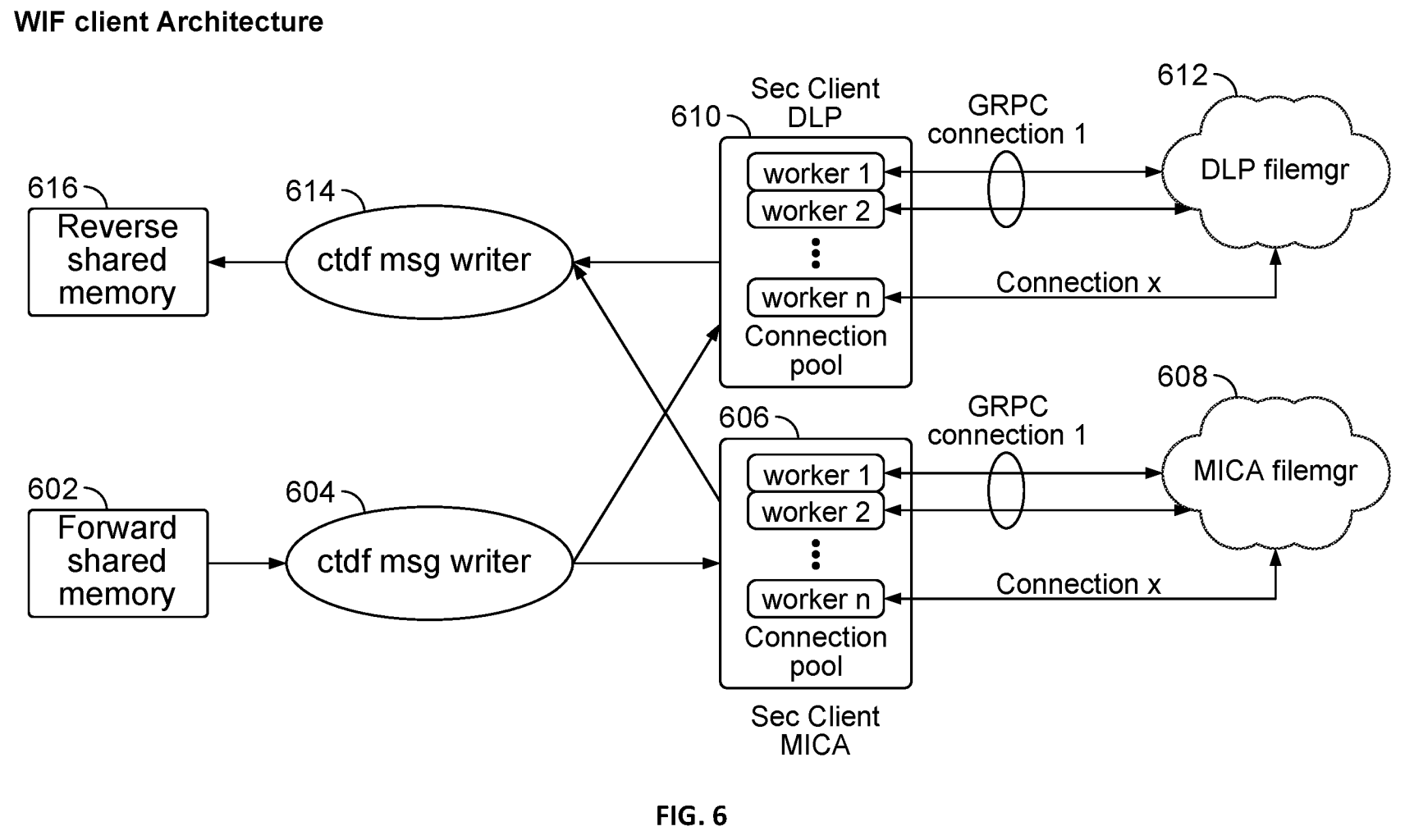

FIG. 6 is a block diagram of a WIF client architecture for providing a data centric approach for supporting multiple inline cloud services in accordance with some embodiments. Specifically, FIG. 6 illustrates an architecture for the WIF client, which can be implemented in a DP of the security platform, such as similarly described above with respect to FIGS. 3 and 4.

Referring to FIG. 6, a forward shared memory 602 is in communication with a message (msg) writer 604 (e.g., for content threat detection files (CTDF)). The message writer component is in communication with a MICA connection pool of workers (e.g., implemented in the Go programming language or another high-level programming language can be similarly used for implementing these functions/routines) as shown at 606 for providing communications with a multiple inline cloud analysis (MICA) File Manager 608 to facilitate communications (e.g., data uploads and response verdicts for each of the cloud detection services to which the security platform has registered/subscribed to for the security service, etc.) with a plurality of cloud detection services of the security service. As shown, each of the workers can have a distinct GRPC connection with the MICA File Manager (e.g., which is similarly shown as File Manager 502 in FIG. 5).

As also shown in FIG. 6, another message writer component 614 is in communication with a DLP connection pool of workers (e.g., implemented in the Go programming language or another high-level programming language can be similarly used for implementing these functions/routines) as shown at 610 for providing communications with a data loss prevention (DLP) cloud detection service. Each of the workers can have a distinct GRPC connection with the DLP File Manager 612 (e.g., similarly shown as File Manager 502 in FIG. 5). As shown, a message (msg) writer 614 is in communication with a reverse shared memory 616.

FIG. 7 is a block diagram of a file manager architecture for providing a data centric approach for supporting multiple inline cloud services in accordance with some embodiments. Specifically, FIG. 7 illustrates an architecture for the file manager (File Mgr), which can be implemented as a cloud-based component, such as similarly described above with respect to FIGS. 3 and 5. As shown, the file manager can be implemented as cloud-based instances for scaling based on computational demand and resources.

Referring to FIG. 7, a UCTX component 702 is in communication with a session pool of workers (e.g., implemented in the Go programming language or another high-level programming language can be similarly used for implementing these functions/routines) as shown at 704 for providing communications with a connection pool of Client App-ID Cloud Engine (ACE) connection pool of workers 706 to facilitate communications (e.g., data uploads and response verdicts) with an ACE detection cloud service (DCS) 708. As shown, each of the workers can have a distinct GRPC connection with the ACE DCS.

As also shown in FIG. 7, the UCTX component is in communication with a session/forward (FWD) block/packet handling protocol adaptor 710 (e.g., implemented in the Go programming language or another high-level programming language can be similarly used for implementing these functions/routines) for providing communications (e.g., including handling of retries, timeouts, replies, etc.) with a connection pool of Client Threat Prevention (TP) connection pool of workers 712 to facilitate communications (e.g., data uploads and response verdicts, based on advanced threat protection, etc.) with a Hyrule TP cloud detection service 714. As shown, each of the workers can have a distinct GRPC connection with the TP cloud detection service.

For example, the disclosed techniques facilitate an inline mode for data uploads to cloud detection services. In the inline mode, the WIF client of the data plane of the security platform does not buffer packets (e.g., which utilizes fewer computational resources associated with the security platform, such as fewer compute and storage resources on the security platform). In this inline mode, the File Manager sends the packet(s) back to the security platform (e.g., which can generally result in a longer latency for processing of these packets by the security platform, such as then forwarding the processed packets to the client, such as client 104 as shown in FIG. 5). The inline mode has the advantage of no data leakage.

As another example, the disclosed techniques can also facilitate an inline blocking mode. In the inline blocking mode, flow control is implemented to facilitate the inline blocking mode.

As yet another example, the disclosed techniques can also facilitate a hold mode. In the hold mode, the WIF client of the data plane of the security platform does buffer packets (e.g., which utilizes greater computational resources associated with the security platform, such as greater compute and storage resources on the security platform). In this hold mode, the File Manager does not need to send the packet(s) back to the security platform (e.g., which can generally reduce computational/bandwidth costs associated with such operations). However, the hold mode can result in some data leakage. The blocking function can be implemented by dropping the held packets.

As a further example, the disclosed techniques can also facilitate a mirror mode. In the mirror mode, the security platform is monitoring the network traffic and only generating alert logs (e.g., which can be used for subsequent security analysis based on the logged data).

Figure 8:
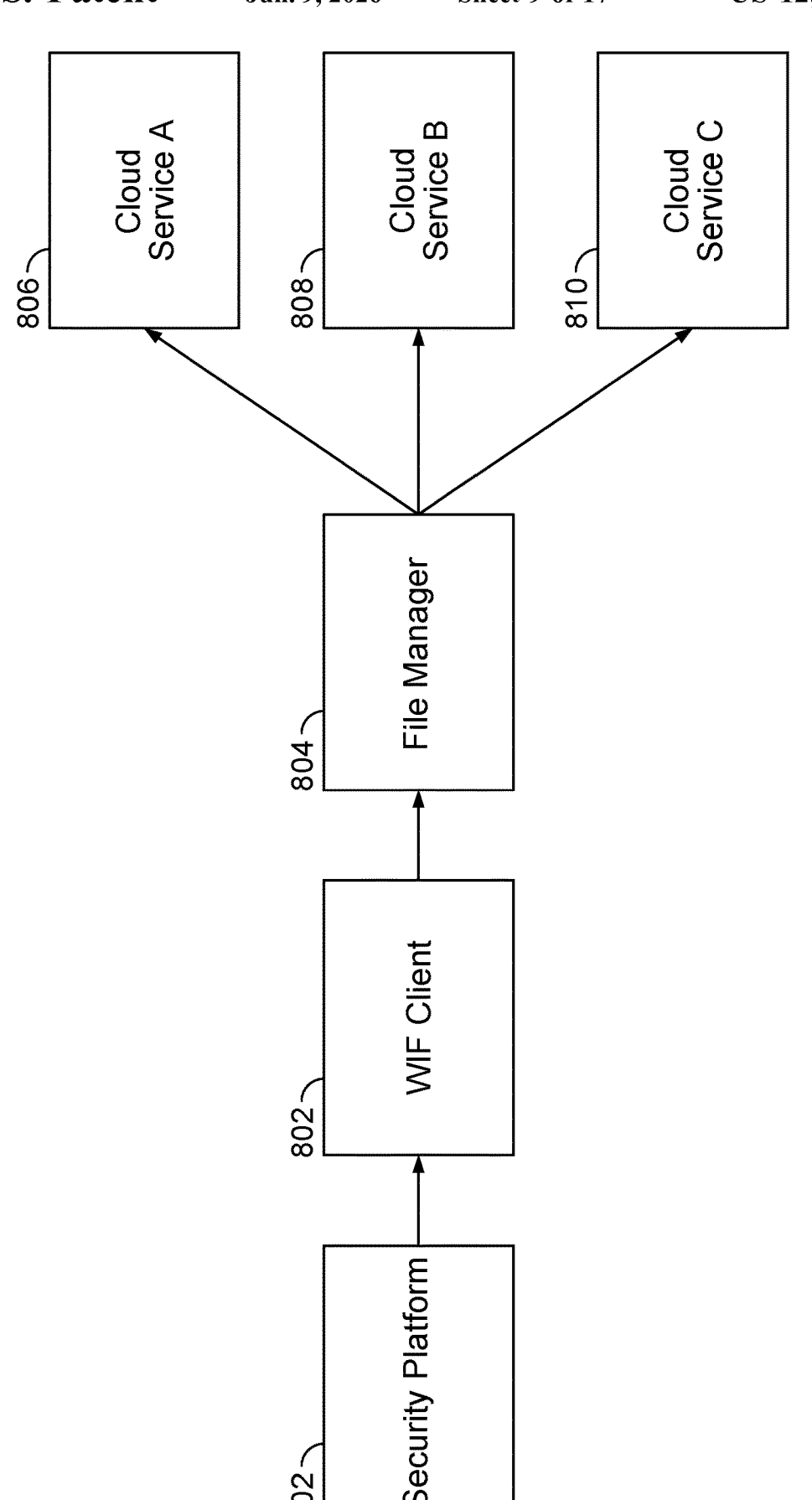
FIG. 8 is a block diagram of a file manager architecture that utilizes common payload types for providing a data centric approach for supporting multiple inline cloud services in accordance with some embodiments.

FIG. 8 is a block diagram of a file manager architecture that utilizes common payload types for providing a data centric approach for supporting multiple inline cloud services in accordance with some embodiments. Specifically, FIG. 8 illustrates an architecture for the file manager (filemgr), which can be implemented as a cloud-based component, such as similarly described above with respect to FIGS. 3, 5, and 7. As also similarly described above, the file manager can be implemented as cloud-based instances for scaling based on computational demand and resources.

Referring to FIG. 8, rather than using a service centric approach that requires having each service utilize a distinct file manager (e.g., in which case the WIF client would require a separate communication channel to data uploads to each distinct file manager) that performs data uploads to cloud services based on distinct payload types with no overlap (e.g., a DLP file manager for DLP related uploads to a DLP cloud service (e.g., such as the DLP cloud service shown at 506 as shown in FIG. 5), an ACE file manager for ACE related uploads, an ATP/TP file manager for ATP/TP related uploads to a TP cloud service (e.g., such as the TP cloud service shown at 508 as shown in FIG. 5), an AUF file manager for AUF file manager uploads to an Advanced URL filtering (AUF) cloud service (e.g., such as the URL category cloud service shown at 510 as shown in FIG. 5), and an APP-ID file manager for APP-ID category file manager uploads to an APP-ID cloud service (e.g., such as the APP-ID cloud service shown at 512 as shown in FIG. 5)), in this example implementation, each service can utilize common payload types for performing data uploads from Security Platform (e.g., firewall) 102 to a WIF Client 802 and then from WIF Client 802 to a shared File Manager 804 using a single channel (e.g., and/or other security services can similarly utilize the disclosed single channel solution, such as the above mentioned Advanced Wildfire service and/or other security services), which aggregates the received data uploads and then sends to the different cloud services as further described herein.

Specifically, in this example implementation, File Manager 804 parses the received data uploads that utilize common payload types to send relevant data uploads to the different services as shown at Cloud Service A (e.g., DLP or another cloud security service, such as described herein) 806, Cloud Service B (e.g., ACE or another cloud security service, such as described herein) 808, and Cloud Service C (e.g., ATP/TP, Advanced URL filtering (AUF), and/or another cloud security service, such as described herein) 810.

More specifically, in this example implementation of a data-centric approach, the disclosed techniques facilitate a content-driven solution for adding new services (e.g., cloud-based security services) and or removing such services. For example, a new module for an ML exploit detection service can utilize the same, common payload type, in which such data uploads for these example new ML exploit detection services can be specified in the common payload type as follows: (1) MLEXP_SQL: http-req-hdr, http-req-body; and (2) MLEXP_CMD: http-req-hdr, http-req-body. Similarly, new, additional C2 detection services can also utilize the same, common payload type, in which such data uploads for this C2 detection service can be specified in the common payload type as follows: (1) HDSS—http-res body; and (2) HDCS—http-req-hdr, http-res-hdr.

In this example implementation, as will be further described below, for each payload type, the decoder marks one WIF-start (e.g., a primary WIF-start) and one WIF-end. The decoder calls a set-WIF-mode call function (callfunc) to enable a service, or to disable an ongoing service. The content package also can use threat-signatures to enable and/or disable a service (e.g., a cloud-based security service). The content package defines a default forwarding for the cloud services (e.g., default forwarding means starting a WIF service without a decoder calling a set-wif-mode or signature triggering).

The disclosed techniques for a data centric approach using a common payload type eliminate various technical challenges that can arise in the service centric approach. For example, the service centric approach can complicate synchronization between file managers for multiple blocking services on the same payload type. As another example, if two inline services share only a partial payload-type data, the security platform would need to track which part of the payload-type is shared and would need to prevent the data leakage for the second service.

Figure 9A:
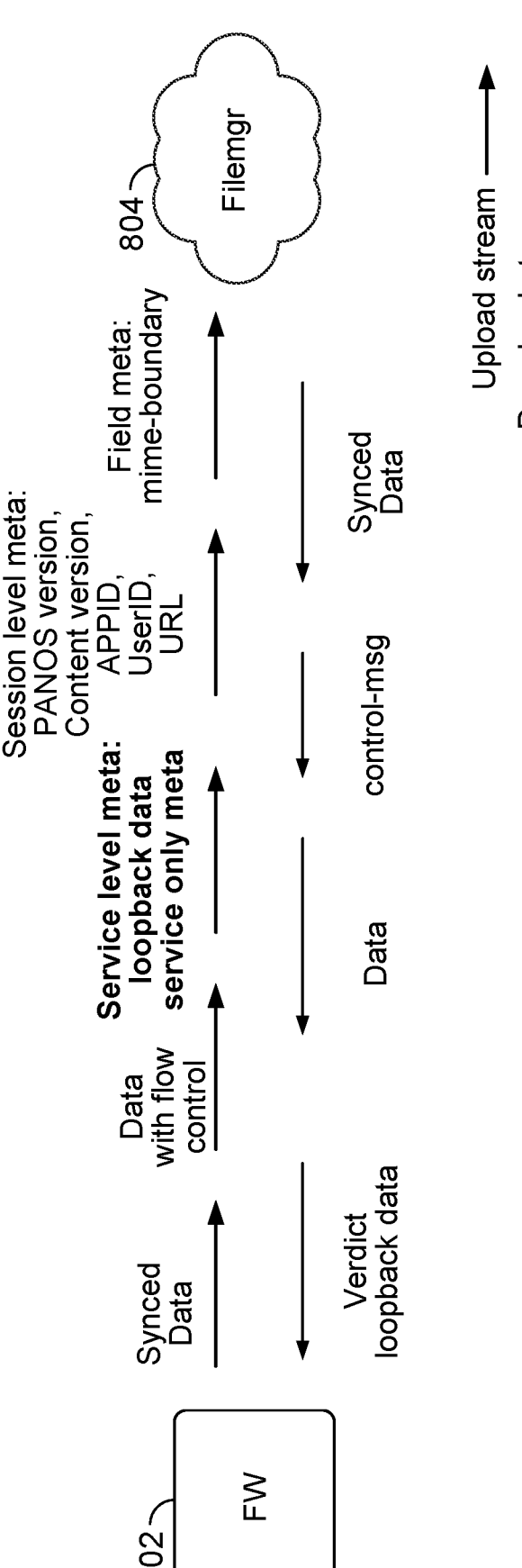
FIG. 9A is a protocol sequence diagram for WIF messages between a security platform and a file manager that utilizes common payload types for providing a data centric approach for supporting multiple inline cloud services in accordance with some embodiments.

FIG. 9A is a protocol sequence diagram for WIF messages between a security platform and a file manager that utilizes common payload types for providing a data centric approach for supporting multiple inline cloud services in accordance with some embodiments. Specifically, FIG. 9A illustrates an example implementation of the WIF messages that can be sent from security platform (e.g., firewall) 102 to file manager (Filemgr) 804 as shown in FIG. 8.

Referring to FIG. 9A, the security platform can first send a field level message (e.g., that can include various meta information, such as a MIME boundary, etc.), then a session level message (e.g., that can include various meta information, such as a security platform OS (e.g., PANOS) version, content version, APP-ID, User-ID, URL, etc.), then a service level message (e.g., that can include various meta information, such as loopback data, service only meta information, etc.), then a data level message (e.g., with flow control information, etc.), and finally a synchronization (synced) data message. As such, the same, common payload type can be effectively and efficiently utilized by different services (e.g., cloud services, such as cloud-based security services as described herein).

As also shown in FIG. 9A, the service side of the file manager communication of messages from file manager (Filemgr) 804 to security platform (e.g., firewall) 102 can include the following sequence: the verdict loopback data (e.g., verdicts from one or more cloud services, such as cloud-based security services as described herein); followed by the data; followed by a control message; and finally a synced data message.

Figure 9B:
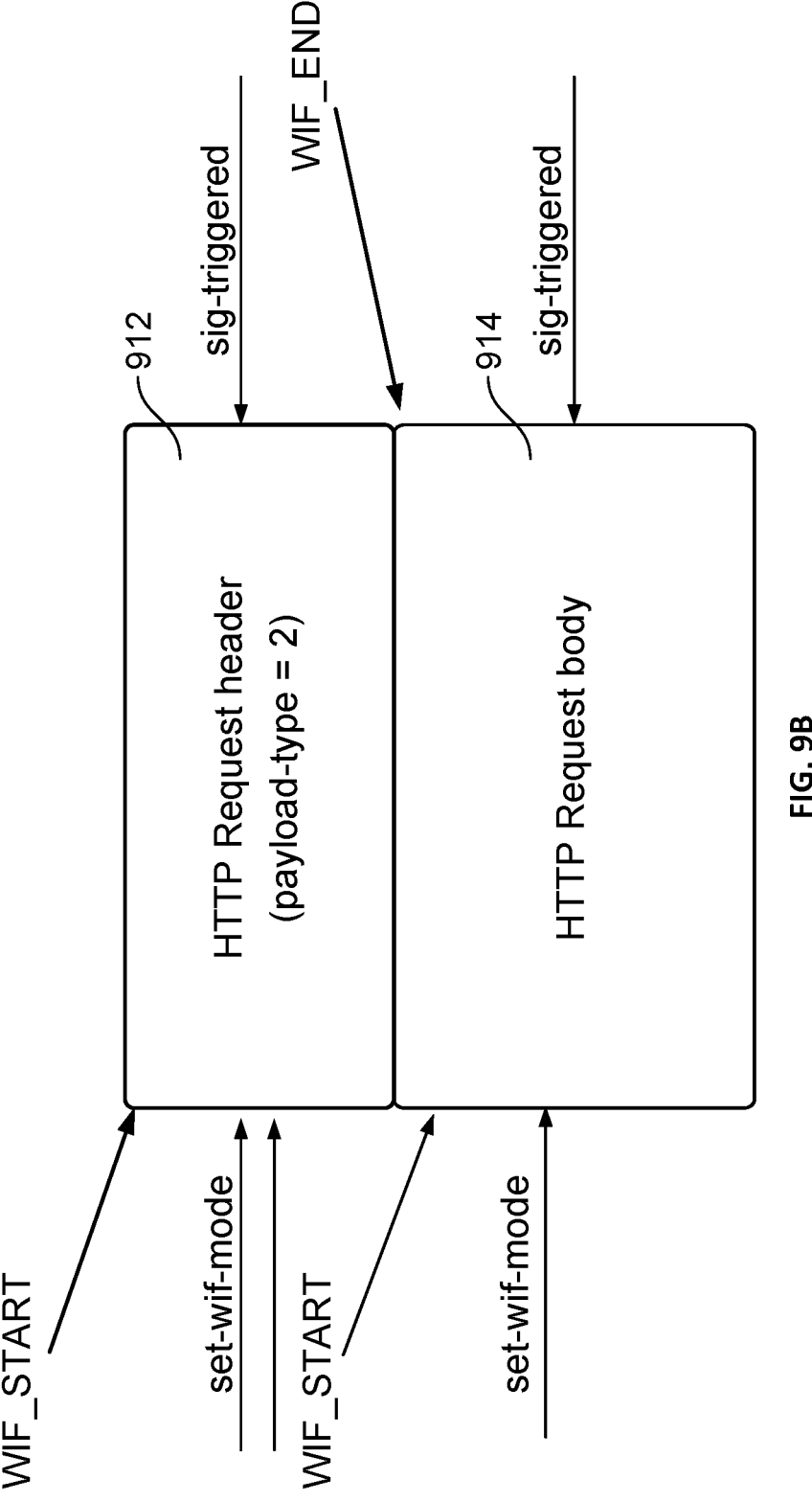
FIG. 9B is a diagram of a format for WIF messages between a security platform and a file manager that utilizes common payload types for providing a data centric approach for supporting multiple inline cloud services in accordance with some embodiments.

FIG. 9B is a diagram of a format for WIF messages between a security platform and a file manager that utilizes common payload types for providing a data centric approach for supporting multiple inline cloud services in accordance with some embodiments. Specifically, FIG. 9B illustrates an example implementation of the format of WIF messages that can be sent from security platform (e.g., firewall) 102 to file manager (Filemgr) 804 as shown in FIG. 8.

Referring to FIG. 9B, an HTTP Request header 912 includes a payload type value. The payload types can be used/shared by different services as similarly described above (e.g., common payload types). In this example implementation, services can be enabled for a given payload type (e.g., payload-type=2 as shown in this example of FIG. 9B) by using the set-WIF-mode function as shown in FIG. 9B and/or such can be signature triggered as also shown in FIG. 9B to implement the WIF_START to send the WIF message to different services (e.g., cloud services, such as cloud-based security services as described herein). Once the WIF END is reached, then the WIF message can be forwarded from the file manager to the relevant services in the cloud. An HTTP Request body 914 also includes a WIF Start and can similarly enable cloud services for the common payload type using the set-WIF-mode function as shown in FIG. 9B and/or such can be signature triggered as also shown in FIG. 9B to implement the WIF START to send the WIF message to different services (e.g., cloud services, such as cloud-based security services as described herein).

Figure 9C:
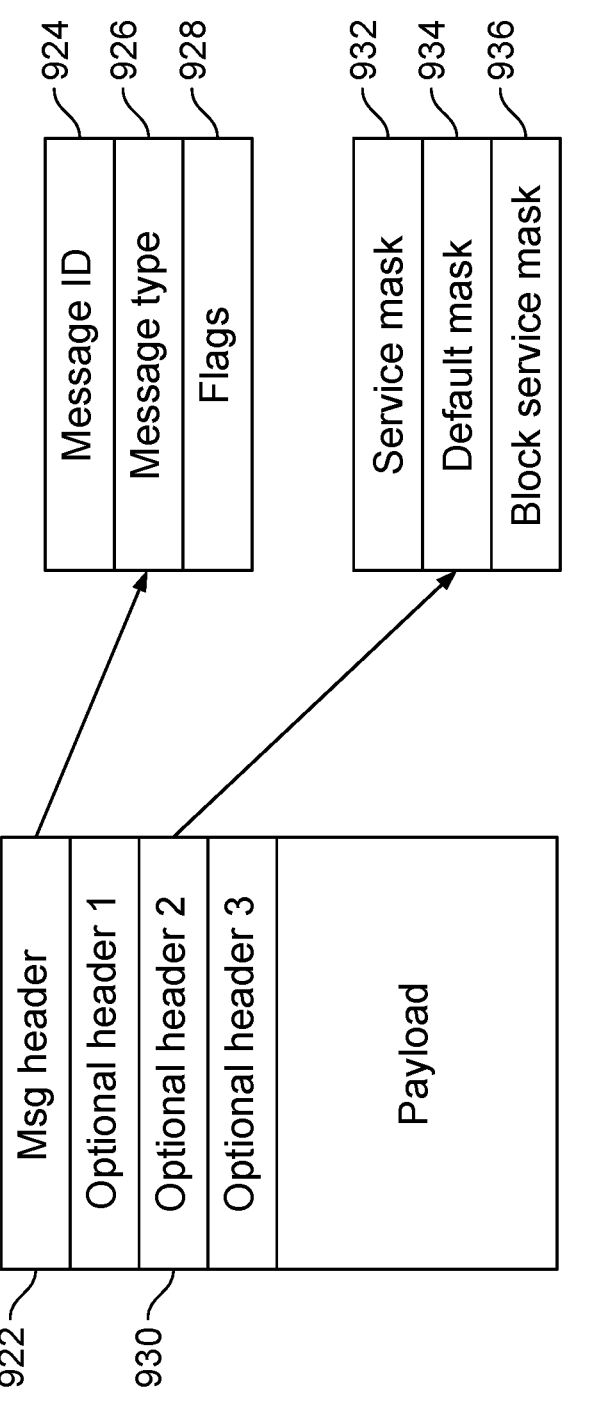
FIG. 9C is another diagram of a format for WIF messages between a security platform and a file manager that utilizes common payload types for providing a data centric approach for supporting multiple inline cloud services in accordance with some embodiments.

FIG. 9C is another diagram of a format for WIF messages between a security platform and a file manager that utilizes common payload types for providing a data centric approach for supporting multiple inline cloud services in accordance with some embodiments. Specifically, FIG. 9C illustrates an example implementation of the format of WIF messages that can be sent from security platform (e.g., firewall) 102 to file manager (Filemgr) 804 as shown in FIG. 8.

Referring to FIG. 9C, a message header 922 includes a message ID 924, message type 926, and flags 928. As also shown, various optional headers, such as optional header 2 can include a service optional header as shown at 930, which can include a service mask 932 (e.g., how many services are in the message), a default mask 934 (e.g., the service is enabled by default configuration), and a block service mask 936 (e.g., how many services are in the blocking service).

FIG. 9D is another diagram of a format for WIF messages between a security platform and a file manager that utilizes common payload types for providing a data centric approach for supporting multiple inline cloud services in accordance with some embodiments. Specifically, FIG. 9D illustrates an example implementation of the format of WIF messages that can be sent from security platform (e.g., firewall) 102 to file manager (Filemgr) 804 as shown in FIG. 8.

In this example implementation, the module and submodule parameters are used for configuration (e.g., ATP module for enabling ATP service, DLP module for enabling DLP service, Cobalt Strike (CS) module for enable CS service, ML Exploit module for enabling ML Exploit service, etc., in which each module can also include submodules that include a unique detection ID for each module/submodule so that the file manager can determine which services are enabled based on these modules/submodules). The detection-svc-id parameter is used in the internal mapping and for sending the message to the file manager. The file manager can then determine the service(s) to which is to send the message from the service optional header.

Further, in this example implementation, tables are used to implement the content-driven solution for providing a data centric approach for supporting multiple inline cloud services. The tables are included in the content to facilitate a content-based framework for automated identification of the services to which to forward the content (e.g., data uploads from the security platform that are received and processed by the file manager for forwarding to various cloud services) as well as the relevant modules, submodules, etc. as further described herein.

Specifically, an example configuration table includes a module, a submodule, a decoder, a default action, and a threat ID.

An example service mapping table includes a module, a submodule, a detection service ID, and a service.

An example payload type table includes a payload type, a payload name, a default forward service list, and a max forward size.

Also, in the per payload (http-request-body), the WIF-start is shared for all services. If there are multiple files, then there are multiple WIF-starts, and the files are sent as meta data in the WIF message communications from the file manager to each the respective services.

FIG. 9E is a forward cache example for providing a data centric approach for supporting multiple inline cloud services in accordance with some embodiments. In this example implementation, a forward entry is included per payload-type, and each payload-type can have multiple services. The forward cache example illustrated in FIG. 9E can be used, for example, for debugging purposes.

These and various other techniques for a data centric approach for supporting multiple inline cloud services will now be further described below with respect to various process embodiments.

Figure 10:
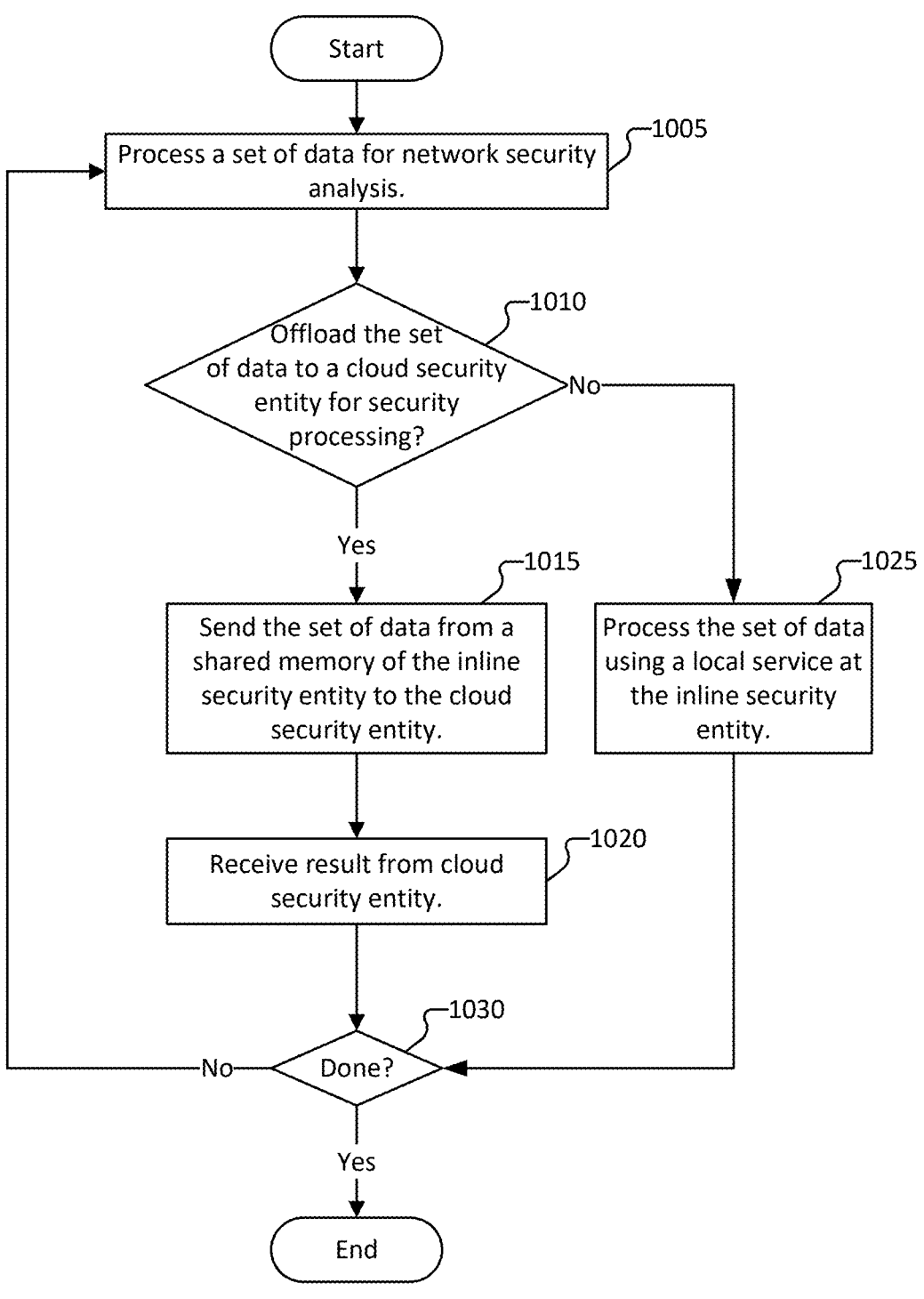
FIG. 10 is a flow diagram of a method for offloading data processing from an inline security entity to a cloud security entity in accordance with some embodiments.

Example Process Embodiments for a Data Centric Approach for Supporting Multiple Inline Cloud Services FIG. 10 is a flow diagram of a process for offloading data processing from an inline security entity to a cloud security entity in accordance with some embodiments. In some embodiments, process 1000 is implemented at least in part by system 100 of FIG. 1 and/or data appliance 102 of FIGS. 2A and 2B. Process 1000 may be implemented by an inline security entity, such as in connection with offloading processing data to a cloud security entity.

At 1005, a set of data is processed for security analysis. The system (e.g., an inline security entity) obtains data that is to be processed. The set of data may correspond to traffic data (e.g., traffic across a network), application data (e.g., information processed or generated by an application), input strings, files, etc.

At 1010, the system determines whether to offload the set of data to a cloud security entity for security processing. In some embodiments, the inline security entity is configured to perform low-latency processing locally and to offload heavy compute processing to the cloud security entity. In response to receiving data, the inline security analysis determines whether to process the set of data locally, such as by using information stored in a cache of the inline security entity. As an example, the system determines whether to locally process the set of data using a local classifier, a policy, a mapping (e.g., a mapping of signatures to indications of whether the data is malicious), etc. As another example, in response to determining that a mapping of signatures to indications of whether data is malicious does not include a signature matching the set of data, the inline security entity determines to offload the security processing (e.g., analysis of whether the data is malicious, etc.) to the cloud security entity.

In response to determining to offload the set of data to the cloud security entity at 1010, process 1000 proceeds to 1015 at which the set of data is sent from a shared memory of the inline security entity to the cloud security entity. In response to determining to offload the set of data to the cloud security entity, the set of data is stored in a shared memory and the set of data is obtained from the shared memory and communicated to the cloud security entity. In some embodiments, processes running on a data plane of the inline security entity store the set of data (e.g., messages for the set of data) to a shared memory in connection with providing the set of data, or a request for the cloud security entity to process the set of data, to another process (e.g., the WIFClient) running on the data plane of the inline security entity. The shared memory may be used as a mechanism of inter-process communication between (i) processes (e.g., tasks, services, etc.) running on the data plane (e.g., running on the writer-side of the shared memory) and (ii) another process (e.g., a daemon, such as the WIFClient) that connects to the cloud service to send request messages or receive verdicts (e.g., result messages). In some embodiments, the other process (e.g., the WIFClient) retrieves the set of data from the shared memory, connects to the cloud security entity, and sends the set of data, or corresponding request message, to the cloud security entity (e.g., a file manager service running on the cloud security entity, which is configured to route the request messages to the corresponding cloud service).

In some embodiments, the storing of the set of data to the shared memory is performed in a separate step from the sending of the set of data from the shared memory to the cloud entity, or the sending of the set of data may comprise the step of storing the set of data.

At 1020, a result is received from the cloud security entity. In response to determining a result corresponding to the processing of the set of data (e.g., a result message), the cloud security entity sends the result to the inline security entity. In some embodiments, the cloud security entity provides the result to the process running on the reader-side of the shared memory (e.g., the WIFClient). In response to obtaining the result from the cloud security entity, the process running on the reader-side of the shared memory (e.g., the forward direction shared memory) writes the result to the shared memory system (e.g., the WIFClient writes the result message to the reverse direction shared memory).

In response to determining that the set of data is not to be offloaded to the cloud security entity at 1010, process 1000 proceeds to 1025 at which the set of data is processed using a local service at the inline security entity. In some embodiments, the inline security entity processes the set of data if the inline processing is not computationally intensive (e.g., the computation required is less than a computation threshold) or if the inline security entity stores information in a local cache that can be used to process the set of data (e.g., to determine whether the set of data is malicious, such as based on a previously analyzed sample).

At 1030, a determination is made as to whether process 1000 is complete. In some embodiments, process 1000 is determined to be complete in response to a determination that no further data is to be processed (e.g., no traffic data is to be assessed with respect to a security analysis), an administrator indicates that process 1000 is to be paused or stopped, etc. In response to a determination that process

1000 is complete, process 1000 ends. In response to a determination that process 1000 is not complete, process 1000 returns to 1005.

FIG. 11 is a flow diagram of a process for a data centric approach for supporting multiple inline cloud services in accordance with some embodiments. In some embodiments, process 1100 is implemented at least in part by system 100 of FIG. 1 and/or data appliance 102 of FIGS. 2A and 2B as well as a file manager (e.g., as shown in FIGS. 5 and 7-9E). Process 1100 may be implemented by an inline security entity, such as in connection with offloading processing data to a cloud security entity.

At 1105, a data upload is received from a security platform at a cloud instance of a file manager.

At 1110, the data upload is processed to determine whether to enable or disable one or more of the cloud security services.

At 1115, the data upload is processed to determine a relevant subset of content (e.g., payloads, such as a malware sample, which can include network traffic from a session, such as a packet capture (pcap) file, or other content, such as a file, web page, URL, email, etc.) to send to the one or more of the cloud security services (e.g., that are enabled for the security platform/enterprise client).

At 1120, a relevant subset of content is sent to the one or more of the cloud security services for offload processing by a cloud service (e.g., a cloud-based security service). For example, a payload type and a module/submodule type(s) in a table (e.g., an action table included in the data upload) can be used to identify a relevant cloud service as similarly described above. Moreover, a cloud service can serve multiple modules that may have similar functionality as also similarly described above. Furthermore, for a given module/submodule, there can be a plurality of associated/relevant cloud services as also similarly described above.

At 1125, a result(s) for the offload processing is obtained (e.g., received from each of the cloud services).

At 1130, the result(s) are provided to the security platform. For example, if the result indicates that an uploaded sample is associated with malware, then the security platform can perform an action based on a security policy (e.g., block, log, alert, allow and monitor, quarantine an associated client, and/or another responsive action can be performed based on the security policy).

In an example implementation, if a given verdict triggers an alert action, a log can be generated accordingly. If the verdict triggers a block action, then the security platform can block the session, and send an abort message to the file manager for other services and delete the forward tracking session.

At 1135, a determination is made as to whether process 1100 is complete. In some embodiments, process 1100 is determined to be complete in response to a determination that no further data is to be processed (e.g., no traffic data is to be assessed with respect to a security analysis), an administrator indicates that process 1100 is to be paused or stopped, etc. In response to a determination that process 1100 is complete, process 1100 ends. In response to a determination that process 1100 is not complete, process 1100 returns to 1105.

Figure 12:
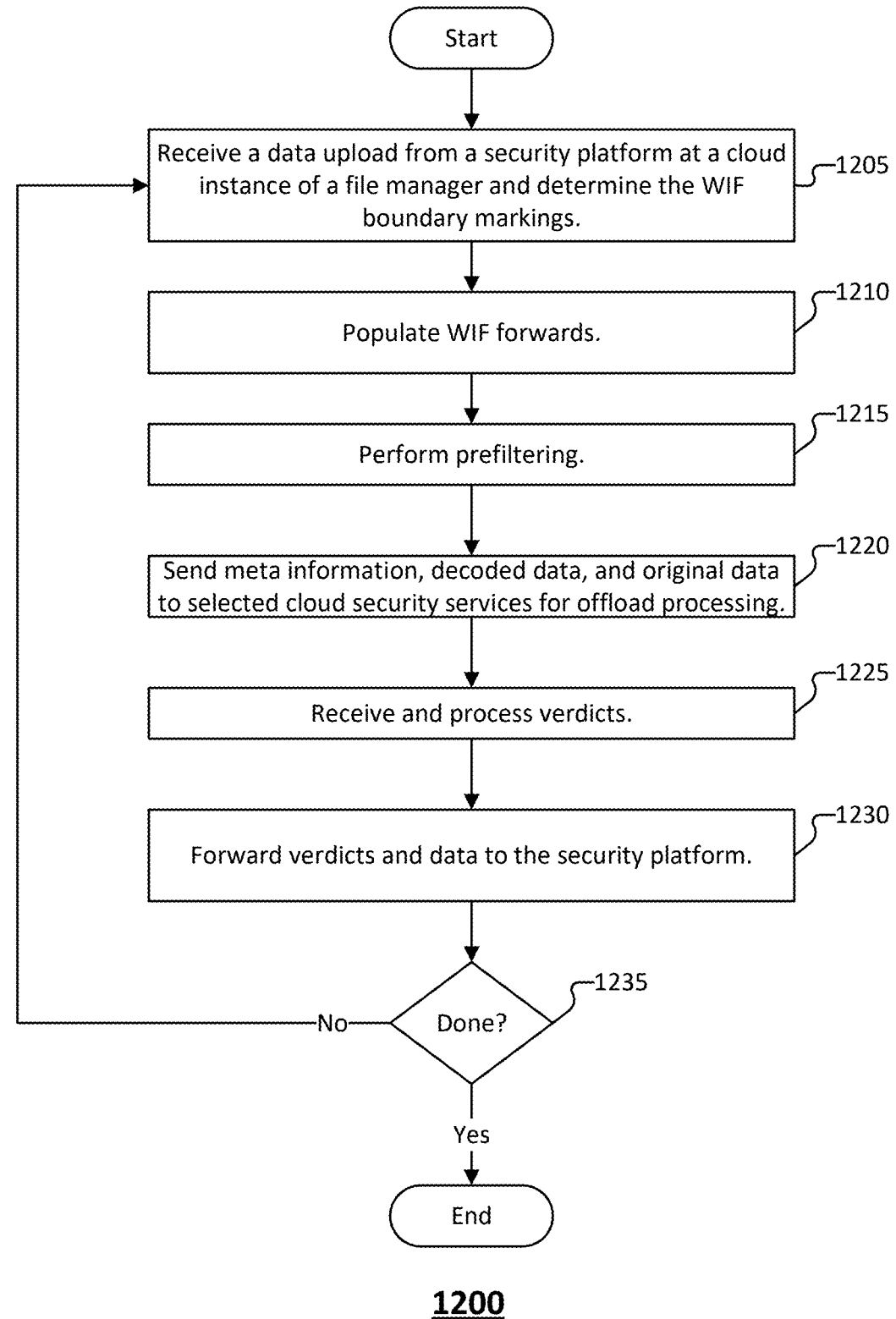
FIG. 12 is another flow diagram of a process for a data centric approach for supporting multiple inline cloud services in accordance with some embodiments.

FIG. 12 is another flow diagram of a process for a data centric approach for supporting multiple inline cloud services in accordance with some embodiments. In some embodiments, process 1200 is implemented at least in part by system 100 of FIG. 1 and/or data appliance 102 of FIGS. 2A and 2B as well as a file manager (e.g., as shown in FIGS. 5 and 7-9E). Process 1200 may be implemented by an inline security entity, such as in connection with offloading processing data to a cloud security entity.

At 1205, a data upload is received from a security platform at a cloud instance of a file manager. At this stage, the file manager processes the data upload to determine the WIF boundary markings.

At 1210, the file manager populates the WIF forwards.

At 1215, the file manager performs prefiltering on the content associated with the data upload. As an example, prefiltering operations can include determining whether a signature is triggered. As another example, prefiltering operations can include determining whether one or more heuristics are satisfied.

At 1220, the file manager sends meta information, decoded data, and original data (e.g., payloads, such as a malware sample, which can include network traffic from a session, such as a pcap file, or other content, such as a file, web page, URL, email, etc.) to the relevant cloud security services for offload processing (e.g., by one or more cloud-based security services).

At this point in process 1200, this processing then proceeds from the upload direction (e.g., from the file manager to the cloud services) to the download direction (e.g., from the cloud services to the file manager).

At 1225, verdicts are received (e.g., from each of the cloud services) and processed at the file manager.

At 1230, the verdicts and relevant data are forwarded to the security platform. For example, if the result indicates that an uploaded sample is associated with malware, then the security platform can perform an action based on a security policy (e.g., block, log, alert, allow and monitor, quarantine an associated client, and/or another responsive action can be performed based on the security policy).

At 1235, a determination is made as to whether process 1200 is complete. In some embodiments, process 1200 is determined to be complete in response to a determination that no further data is to be processed (e.g., no traffic data is to be assessed with respect to a security analysis), an administrator indicates that process 1200 is to be paused or stopped, etc. In response to a determination that process 1200 is complete, process 1200 ends. In response to a determination that process 1200 is not complete, process 1200 returns to 1205.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing security processing at an inline security entity, comprising:

one or more processors configured to:

process a set of data for network security analysis;

determine whether to offload the set of data to a cloud security entity for the security processing; and in response to determining to offload the set of data to the cloud security entity, send the set of data from the inline security entity to a cloud service portal, wherein:

the cloud service portal performs the following:

receives a data upload from the inline security entity, and processes the data upload to determine content to send to one or more cloud security service of a plurality of cloud security services for offload processing based on a data type associated with the content, wherein the plurality of cloud security services includes a first cloud security service and a second cloud security service, wherein the processing of the data comprises to:

determine a payload type of the content, wherein the payload type includes one or more of the following: Hypertext Transfer Protocol Request Header (http-req-hdr), Hypertext Transfer Protocol Request Body (http-req-body), Hypertext Transfer Protocol Response Body (http-res body), and/or Hypertext Transfer Protocol Response Header (http-res-hdr), and wherein the payload type includes a first payload type, a second payload type, or both; and send the contents to the one or more cloud security service, wherein in the event that the payload type includes the first payload type, send the contents to the first cloud security service, and wherein in the event that the payload type includes the second payload type, send the contents to the second cloud security service; and the cloud service portal receives a result from the one or more of the plurality of cloud security services and forwards the result to the inline security entity, wherein the inline security entity performs an action based on a security policy associated with the inline security entity; and a memory coupled to the one or more processors and configured to provide the one or more processors with instructions.

2. The system of claim 1, wherein the inline security entity sends the set of data to the cloud service portal using a single channel of communication.

3. The system of claim 1, wherein the inline security entity sends the set of data to the cloud service portal using a single channel of communication that includes a remote procedure call.

4. The system of claim 1, wherein the cloud service portal includes a file manager.

5. The system of claim 1, wherein the cloud service portal includes a cloud instance of a file manager.

6. The system of claim 1, wherein the set of data is sent from a shared memory of the inline security entity to the cloud service portal by a data plane of the inline security entity.

7. The system of claim 1, wherein a data plane of the inline security entity uses a connector service associated with a service or type of processing that is offloaded to the cloud security entity.

8. The system of claim 1, wherein the cloud service portal determines the cloud security entity to which to assign the set of data based on a table included in the set of data.

9. The system of claim 1, wherein the cloud service portal determines the cloud security entity to which to assign the set of data based on a table included in the set of data, wherein the table includes a service mapping table that specifies a module and/or submodule.

10. The system of claim 1, wherein the cloud service portal determines the cloud security entity to which to assign the set of data based on a table included in the set of data, wherein the table includes a service mapping table that specifies a module and/or submodule and a payload type table.

11. The system of claim 1, wherein the set of data is received from another cloud instance that is in communication with the inline security entity.

12. The system of claim 1, wherein the set of data includes a payload that is sent from the cloud service portal to a plurality of cloud security services.

13. The system of claim 1, wherein the cloud service portal is configured to process the set of data using an inline mode, a hold mode, and/or a mirror mode.

14. The system of claim 1, wherein the cloud service portal processes the set of data to determine whether to enable or disable one or more of the plurality of cloud security services to facilitate a content-driven adding or removing of cloud security services.

15. The system of claim 1, wherein the cloud service portal processes the set of data to determine whether to enable or disable one or more of the plurality of cloud security services based on a function call included in the data upload to facilitate a content-driven adding or removing of cloud security services.

16. The system of claim 1, wherein the cloud service portal processes the set of data to determine whether to enable or disable one or more of the plurality of cloud security services based on a signature that is triggered based on content in the data upload to facilitate a content-driven adding or removing of cloud security services.

17. The system of claim 1, wherein the plurality of cloud security services comprises one or more of the following: a data loss prevention (DLP) service, an Internet of Things (IoT) service, an application cloud engine (ACE) service, and a URL category (URLCAT) service.

18. A method for performing security processing at an inline security entity, comprising:

processing, by one or more processors, a set of data for network security analysis;

determining whether to offload the set of data to a cloud security entity for the security processing; and in response to determining to offload the set of data to the cloud security entity, sending the set of data from the inline security entity to a cloud service portal, wherein:

the cloud service portal performs the following:

receives a data upload from the inline security entity, and processes the data upload to determine content to send to one or more cloud security service of a plurality of cloud security services for offload processing based on a data type associated with the content, wherein the plurality of cloud security services includes a first cloud security service and a second cloud security service, wherein the processing of the data comprises:

determining a payload type of the content, wherein the payload type includes one or more of the following: Hypertext Transfer Protocol Request Header (http-req-hdr), Hypertext Transfer Protocol Request Body (http-req-body), Hypertext Transfer Protocol Response Body (http-res body), and/or Hypertext Transfer Protocol Response Header (http-res-hdr), and wherein the payload type includes a first payload type, a second payload type, or both; and sending the contents to the one or more cloud security service, wherein in the event that the payload type includes the first payload type, send the contents to the first cloud security service, and wherein in the event that the payload type includes the second payload type, send the contents to the second cloud security service; and the cloud service portal receives a result from the one or more of the plurality of cloud security services and forwards the result to the inline security entity, wherein the inline security entity performs an action based on a security policy associated with the inline security entity.

19. The method of claim 18, wherein the inline security entity sends the set of data to the cloud service portal using a single channel of communication.

20. A computer program product for performing security processing at an inline security entity embodied in a non-transitory computer readable medium, and the computer program product comprising computer instructions for:

processing a set of data for network security analysis;

determining whether to offload the set of data to a cloud security entity for the security processing; and in response to determining to offload the set of data to the cloud security entity, sending the set of data from the inline security entity to a cloud service portal, wherein:

the cloud service portal performs the following:

receives a data upload from the inline security entity, and processes the data upload to determine content to send to one or more cloud security service of a plurality of cloud security services for offload processing based on a data type associated with the content, wherein the plurality of cloud security services includes a first cloud security service and a second cloud security service, wherein the processing of the data comprises:

determining a payload type of the content, wherein the payload type includes one or more of the following: Hypertext Transfer Protocol Request Header (http-reg-hdr), Hypertext Transfer Protocol Request Body (http-req-body), Hypertext Transfer Protocol Response Body (http-res body), and/or Hypertext Transfer Protocol Response Header (http-res-hdr), and wherein the payload type includes a first payload type, a second payload type, or both; and sending the contents to the one or more cloud security service, wherein in the event that the payload type includes the first payload type, send the contents to the first cloud security service, and wherein in the event that the payload type includes the second payload type, send the contents to the second cloud security service; and the cloud service portal receives a result from the one or more of the plurality of cloud security services and forwards the result to the inline security entity, wherein the inline security entity performs an action based on a security policy associated with the inline security entity.

* * * * *